US010136242B2

(12) United States Patent
Lam

(10) Patent No.: US 10,136,242 B2
(45) Date of Patent: Nov. 20, 2018

(54) CLOUD COMPUTING SYSTEM CONFIGURED FOR A CONSUMER TO PROGRAM A SMART PHONE AND TOUCH PAD

(76) Inventor: Peter Ar-Fu Lam, Torrance, CA (US)

(*) Notice: Subject to any disclaimer, the term of this patent is extended or adjusted under 35 U.S.C. 154(b) by 1226 days.

(21) Appl. No.: 13/200,416

(22) Filed: Sep. 24, 2011

(65) Prior Publication Data

US 2012/0021731 A1    Jan. 26, 2012

Related U.S. Application Data

(63) Continuation-in-part of application No. 11/041,048, filed on Jan. 21, 2005, now Pat. No. 9,465,588, and a continuation-in-part of application No. 10/988,822, filed on Nov. 15, 2004.

(51) Int. Cl.
*H04W 4/00* (2018.01)
*H04L 29/08* (2006.01)
*H04W 4/60* (2018.01)

(52) U.S. Cl.
CPC ............... *H04W 4/00* (2013.01); *H04L 67/12* (2013.01); *H04W 4/60* (2018.02)

(58) Field of Classification Search
CPC ................ A63H 30/04; A63H 2200/00; A63F 2009/2433; A63F 2009/2489
USPC ............................................. 700/65, 66, 78
See application file for complete search history.

(56) References Cited

U.S. PATENT DOCUMENTS

| | | | | |
|---|---|---|---|---|
| 5,724,074 A | * | 3/1998 | Chainani et al. | 345/474 |
| 5,752,880 A | * | 5/1998 | Gabai et al. | 463/1 |
| 6,206,745 B1 | * | 3/2001 | Gabai et al. | 446/91 |
| 6,542,925 B2 | * | 4/2003 | Brown et al. | 709/208 |
| 6,773,322 B2 | * | 8/2004 | Gabai et al. | 446/91 |
| 6,773,344 B1 | * | 8/2004 | Gabai et al. | 463/1 |
| 2004/0236470 A1 | * | 11/2004 | Dooley et al. | 700/255 |

OTHER PUBLICATIONS

1999 Lego Mindstorms Robotics Invention System 1.5 (4677695), 4 pages.*
LogoBlocks: A Graphical Programming Language for Interacting with the World by Andrew Begel AUP Advisor: Mitchel Resnick Epistemology and Learning Group MIT Media Laboratory May 24, 1996, 23 pages.*
Collaborative Robotics with Lego Mindstorms Master Thesis of Andreas Junghans Department of Computer Science Karlsruhe University of Applied Sciences, Germany Mar. 1, 2001 to Jul. 31, 2001 Supervisor: Prof. Dr. Peter A. Henning, 71 pages.*
Grow With Me, Easy Format Jun. 4, 1999, 20 pages.*
Learning to Program in Java: Using Lego™ Mindstorms® Robots and LeJOS by William J Rust 2005, 168 pages.*
S.Y. Hashimi and S. Komatineni, "Pro Android," Springer-Verlag, 2009.*

(Continued)

Primary Examiner — Christopher E. Everett

(57) ABSTRACT

A cloud computing system is provided to support a consumer for programming a smart phone/touch pad. Set of accessory members is provided to enable said consumer to build and program a consumer designed article that comprises said consumer programmed smart phone/touch pad.

20 Claims, 23 Drawing Sheets

(56) References Cited

OTHER PUBLICATIONS

P.B. Lawhead et al., 2002. A road map for teaching introductory programming using LEGO© mindstorms robots. In Working group reports from ITiCSE on Innovation and technology in computer science education (ITiCSE-WGR '02). ACM, New York, NY, pp. 191-201.*

Mark H. Goadrich and Michael P. Rogers. 2011. Smart smartphone development: iOS versus android. In Proceedings of the 42nd ACM technical symposium on Computer science education (SIGCSE '11). ACM, New York, NY, USA, pp. 607-612.*

* cited by examiner

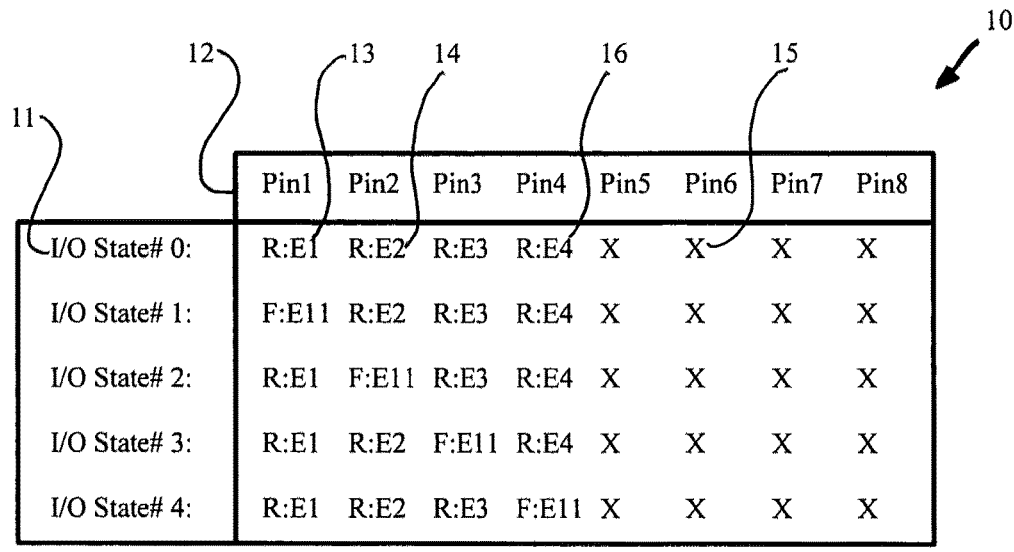
Fig 1-A
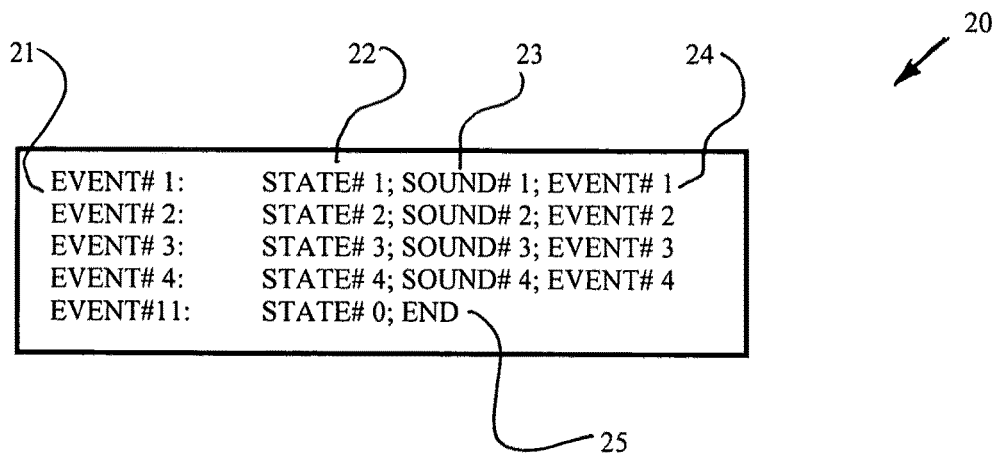
Fig. 1-B

CLOUD COMPUTING SYSTEM CONFIGURED FOR A CONSUMER TO PROGRAM A SMART PHONE AND TOUCH PAD

RELATED APPLICATIONS

This is a continuous in part of pending U.S. patent application Ser. No. 10/988,822 filed Nov. 15, 2004 and pending U.S. patent application Ser. No. 11/041,048 filed Jan. 21, 2005 now U.S. Pat. No. 9,465,588. These applications are incorporated herein for reference.

FIELD OF THE INVENTION

The present invention relates to a cloud computing system that enables a non-professional consumer to design, build and program an article or consumer designed system. A smart phone/touch pad is provided for the consumer to control a selected set of accessory members provided to build said consumer designed article.

BACKGROUND OF THE INVENTION

Traditional building kits require users to learn the detail technical structure about a microprocessor, assembly language to program the microprocessor and the design of supporting electronics circuit. Assembly language is extremely difficult for beginners to handle and debug. Supporting circuit design such as LCD display also requires in depth knowledge of electronics design skill. It is the objective of this invention to provide a system that allows a non-professional consumer to learn and start trying to build and program his own design or invention within a day with a smart phone/touch pad. An easy programming environment for consumer to program smart phone/touch pads of their hobby designs plays an important role to encourage consumer to participate an active role in the smart phone/touch pad revolution. It also encourages cell phone manufacturers to offer additional unusual features for the smart phones/touch pads, which may be needed by the consumers to expand their design exploring ventures. In addition, new product designs invented by the consumer may offer new business opportunities to the market and benefit the supply chain of the smart phones/touch pads. These factors drove the initiation of the subject invention.

SUMMARY OF THE INVENTION

Definitions: Since the field of application and the programming system of the subject patent application is currently very new to the market, proper interpretation of terms is important for a person having ordinary knowledge in the art to understand the innovative characteristics of the subject invention. Accordingly this section provides explicit definitions of terms for controlling proper interpretation of the specification and claims. For the term "retail building kit", the sub-term "building kit" is defined as a collection of elements or component members enabling consumers to build articles designed by them. Addition of the sub-term "retail" means the elements or components are packaged for retail purpose, or the components are distributed through traditional retail channels to reach the consumers.

"Non-professional consumers" or "non-technical users" are defined to be ordinary consumer who has little knowledge to handle engineering design works, including knowledge of traditional programming languages commonly used in the technical field, such as assembly language, C or Java, or requirement of knowledge about traditional developer programming system of smart phone/touch pad such as those of the Apple iPhone, iPad and the Google Android systems.

"Cell phone" is defined to be portable wireless phone able to make voice/data communication with another cell phone through public cell phone networks. Typical examples are the cell phones communicating through the AT&T and Verizon wireless cell phone networks.

"Touch pad" is defined to be the portable touch control pads capable of connecting to a wi-fi internet network or public cell phone network for communication of data, voice, image or video. Typical examples are iPad and Android compatible pads.

"Cell phone/touch pad" is defined to be cell phone "or" touch pad.

"Smart phone/touch pad" is defined to be a cell phone or touch pad capable of executing an application program downloaded into said cell phone/touch pad. Typical examples are the iPhone, iPad and the Android compatible phones and touch pads.

"Proprietary cell phone/touch pad" is defined to be special versions of cell phone/touch pad designed for the "building kit" purpose of the subject application, wherein features normally required by traditional cell phone/touch pad may be deleted for cost improvement reasons; or features normally not required by traditional cell phone/touch pad are added. The deviation of "proprietary cell phone/touch pad" from the traditional cell phones/touch pads usually makes it not desirable for traditional cell phone touch pad users. Examples of added feature is the cell phone 1608 of FIG. 16A, which comes with four special mounting holes 1632-1635 for securely mounting the cell phone into the consumer design assembly 1600. Example of reduced feature is the cell phone 2300 of FIG. 23 wherein no dial pad or LCD display are available. The deviations will make the cell phones 1608 and 2300 less appealing for normal cell phone users.

"Standardized communication connector" is defined as the industrial standard connector provided by the cell phone/touch pad to communicate data with an external circuit. Standardized communication connector of iPhone, iPad is the standardized Apple connector of these products. Standardized communication connector for Android phones is usually refer to the serial data USB connector provided for these devices.

"Smart phone/touch pad hosting system" is defined as a standardized or regulated system provided and maintained by a known hosting entity for servicing a standard family of cell phone/touch pad products, application programs written under the standardized or regulated system are executable by the different models of the family. Current two well known "Smart phone/touch pad host systems" are available to the market—the iOS system of Apple to service the iPhone and iPad and the Android system of Google to service the Android phones and touch pads.

"Application store" or "application market place" are defined to be a marketing system with which a consumer is able to shop, or purchase, or download application programs developed by professional developers.

Both the terms "platform system for professional developers" and "platform system configured for professional application developers" are defined as the combination of hardware and software development system provided for professional developers to write application programs.

"Application programs" are defined as the programs written by professional developers with the support of the "Platform system for professional developers" offered by the hosting entity, for distributing to the smart phones/touch pads of the consumer. Currently there are two examples of "Platform system for professional developers" available in the market. The first one is the Apple iOS system, which includes but not limited to the iOS Simulator, Xcode tool set, Xcode IDE and Apple LLVM compiler. The second example is the Google Android system which includes but not limited to the Android SDK, companion Android NDK, AVD Manager, Google USB driver as well as the C, C++ programming tools suitable for working in the Android platform.

"Platform system for non-professional consumer" is defined as the combination of hardware and software development system for non-professional consumer to write program for a controller unit, or for a smart phone/touch pad, so as for the controller unit, or smart phone/touch pad to work with an article or system designed and/or programmed by a consumer.

"Consumer programming software" is defined as software provided for a non-professional consumer to write a program with the support of "Platform system for non-professional consumer".

"Consumer programmable system" is defined as a system of design programmable by a non-professional consumer.

Both the terms "consumer designed article" and "consumer designed system" are defined to be an article or a system designed by a non-professional consumer. Consumer designed article or system may comprise a combination of hardware design and software programming provided by the non-professional consumer.

"Machine level software system" is defined as the machine codes or Assembly language level of software to work with a processor.

"OS" is defined according to trade meaning as the primitive "Operation System" of a computing device. Typical examples of OS are the Windows series provided by Microsoft, iOS provided by Apple, the Android OS provided by Google and the Linux, an open source OS.

"Operation level software system" is defined as the software environment supporting an OS, including drivers for an OS to interface with supporting hardwares, and supporting programs for the OS to interface with higher level languages.

"Compiler" is defined according to trade meaning as a computing system configured to compile or translate programs written by a programmer into codes executable by a computing device, or smart phone/touch pad.

Both the terms "computer memory" and "digital storage media" are defined as any kind of memory or storage media capable to store digital data and for the data to be retrieved when required. Scope of these terms included but not limited to semiconductor memory, magnetic media and optical media.

Both the terms "easy programming language" and "easy programming software" are defined as a method of programming comprising the following steps:
 (a) defining m inputs for a computing device to receive data, triggers or signals, wherein m is an integer equal or greater than one;
 (b) defining n outputs for said computing device to transmit trigger, data or signals, wherein n is an integer equal or greater than one;
 (c) specifying x configuration state, wherein each configuration state defines the configuration of at least one input and/or one output and x is an integer equal or greater than one;
 (d) specifying y events to be executed by said computing device, wherein y is an integer equal or greater than one;
 (e) specifying an event to be executed when the signal, trigger or data received by an input satisfied a predefined qualifying condition and
 (f) enabling an event to switch from a current configuration state to another configuration state.

It should be noted that further significant technical improvements of the above defined "easy programming language" became some of the core parts of this invention that enable a non-professional consumer to write programs for a controller unit, or smart phone/touch pad so as to build and program a consumer system designed by the consumer.

It is the intention of the first parent invention to provide a complete solution of programmable building kits to support invention or hobby article building of ordinary people without professional engineering or software knowledge. This solution is supported with a significantly improved version of the programming method invented by the applicant as disclosed in U.S. Pat. No. 5,867,818, named as Easy Format. Improved version of Easy Format herein referred as "easy programming language", is an event driven programming method very suitable for supporting invention or hobby building kits. This is because non-professional consumers are not required to learn the assembly language and development tools of a microprocessor. The terms "programming method", "programming language" or "compiling software", are very different as compared with traditional software. These terms represent "tools" provided in conjunction with a programming computer for users to write traditional software programs. The process of using these tools resulted with various pre-computer and post computer activities depend on the nature of the program to be written with the programming language. When compared with assembly language and other high level programming language, "easy programs" defined by programs written in easy programming language, are very easy to be read and understood by other programmers. This characteristic makes it a programming language of choice for non-professional consumers, who can share and discuss software programs with other building kit hobbyists. When compared with other two dimensional flow chart type of programming languages, easy programming language is superior because it provides means to structure multiple dimensions program flow with two to three tables. Programming with easy programming language is simply a job of filling up tables elements according to the program flow structured inside the mind of the consumer.

The traditional form of Easy Format has already become an industrial standard for professional electronics engineers and microprocessor programmers. Reference instructions had been published by U.S. Pat. No. 5,867,818, which had been licensed to many microprocessor suppliers in the public domain. Accordingly further in depth description of the traditional Easy Format software designed for professional engineers/programmers is not repeated in detail in this application. In summary, Easy Format or easy programming language is a programming language, or a programming method that enables a user to program a microprocessor IC or a controller unit to interact with hardware/software triggers or external circuitry.

Traditional or original Easy Format was designed for professional engineers/programmers to program microprocessors. It is not suitable for programming more complex electronics devices, such as smart phones or touch pads. Accordingly significant improvements to the traditional Easy Format programming method are researched and disclosed in this patent application. Improved features of the language are provided to support the special application of programming building kits for nonprofessional people, particularly for the application to program a smart phones/touch pads. These improvements make use of enhanced interactive visual features of computer screen to minimize programming labor and errors. User-friendly symbols and graphic labels are provided on a computer screen to facilitate composing a program written in the enhanced easy programming language. The programming process is further enhanced by providing very special pull down menu and drag and drop processes customized to the nature of the improved easy programming language. Special new instructions are added for the microcontroller to handle serial data communication. Command are added to directly control the building kit components such as motors, light bulbs. New instructions allow message to be sent directly to display or LCD panels. New interface/protocol is provided for a controller unit, or a smart phone/touch pad to communicate with a remote device such as a wireless phone. Most push button keys of a remote controller provided in this system is user programmable and therefore a label area is added for the user to define the nature of the input keys.

This application disclosed a preferred embodiment for a user to write a program with the improved easy programming language. Executable code of the program is transferred to a flash memory for interfacing a controller unit. Other methods of downloading the executable code to the target device, such as a smart phone/touch pad are known to the industry is therefore considered to be within the scope of this invention.

In order to reduce the number of connecting wires required between the controller unit/smart phone/touch pad and the accessory members, and to reduce the real time work load of the main controller unit or that of the smart phone/touch pad processor, multiple tiny controllers are added to the internal structure of the accessory members to share the local jobs of controlling the accessory members, such as adjusting motor speed, converting potentiometer readings into digital data, encoding and decoding audio and/or visual data. The benefits of building kits features are demonstrated in a robot building project later disclosed in this application.

It should also be pointed out that most building blocks of the kit disclosed are configured to mount on a piece of core material with screws or nails. After experimenting different materials and designs in searching a perfect core structure for this research, it was discovered that wood block is a very preferred core mounting material. Wood blocks, which are low cost and widely available in many homes, also provide other significant advantages. Wood is easy to be tailored to the desirable shape of the article to be built. Different wood blocks may also be combined or glued to form the special shape required for special article building projects.

An advanced remote control member come close to the structure of the controller unit is added to the system for a user to effectively communicate with the controller unit. This remote control member is connected to the controller unit by cable wire or by wireless method such as radio frequency, infrared, or ultrasonic communication designs. The remote control member may also be equipped with a LED or LCD display panel or speakers for providing audio/visual communication with the controller unit. In another application sample, the remote control member can be represented by a mobile phone. In this case the building kit will require a dialing circuit and/or a modem circuit for the controller unit to communicate with the wireless phone. This dialing and/or modem circuit may be installed inside the controller unit or positioned externally as an external accessory member. In case the consumer designed article comprises a smart phone/touch pad, the control communication is conducted through the cell phone network connecting the two cell phones. Accordingly the accessory members in this system are defined as any modular members required to support the controller unit for building the consumer designed article. Accessory members include any mechanical components structured to be mounted together to form the consumer designed article.

An objective of the second parent invention is to provide a programmable toy system that can be easily handled by non-professional consumers. An improved version of East Format software compiler is discussed herein to enable a consumer without any technical know how to program a toy according to his/her imagination and desire. The programmable toy system can be provided in many different forms of toy articles, including but not limited to dolls, male action figures, robots, motor vehicles, race tracks, play sets, and games. Characteristics of a programmable toy article are the structure of the sensors and transducers connected to a microcontroller provided inside a toy member. The microcontroller inside the toy is then programmed to activate the transducers according to the signals received from the sensors. Typical examples of the sensors are motion sensors such as motors and solenoids; position sensors; different kinds of switches; sound sensors such as condenser microphone and light sensors, including digital camera sensors. Typical examples of transducers are heat transducers; light transducers such as light bulbs and LEDs, LCD displays; sound transducers; and motion transducers. A programmable toy may also be equipped with computer interface circuits and possibly a modem or dialing circuit, wireless data circuit such as wi-fi circuit or further equipped with a programmable smart phone/touch pad circuit for the toy to communicate with a remote phone or a web site without hooking up with a computer.

The toy is also preferred to equip with wired or wireless designs of identification circuits for a master programmable member to interface with a family of accessory toy members. In another preferable design, a keypad such as a numeric keypad is provided on top of a programmable toy article to provide interactive responses or to direct different play modes by the users after the toy article is programmed. A numeric keypad carries a special meaning to the toy, it allows the toy to be programmed with high number of operation modes and also allow the user to design the toy with activities involving numbers such as a function to activated or locked with special sequence of codes. The programmable toy is also preferred to be equipped with a remote controller for the user to control the toy remotely, and also enabling the user to override a preprogrammed sequence remotely when desired.

Most programmable toys promoted in the market are not really programmable toys. The different play patterns provided by the toy are actually preprogrammed in the factory. The user is only permitted to select one of the preprogrammed play modes. Another type of programmable toys allows the user to select a sequential series of preprogrammed functions. These types of programmable toys are actually sequence controllers and not a real user programmable toy as defined in this application. A user or consumer written program defined in this application requires the user to access to a software compiler, write or compose a program and then to compile the program into codes executable by the microcontroller of the toy. The compiled code of a user program is either downloaded direction into the toy or transferred into a memory module or cartridge, and then for the memory module to be connected to the toy for the execution by the microcontroller inside.

The toy company providing the programmable toy product line is recommended to provide a supporting web site. With this web site, a user may obtain interactive support from a remote help desk to use the system or to compose a user program. Remote help desk for user programming had not been successful because most programs written in assembly language and even high level languages such as C and Java are very difficult to be understood by a third party. Since easy programming language is now such a user friendly programming language, that most people can easily understand the program flow of a program written by another person, the remote help desk concept to support consumer programming now makes sense.

In another application example, the consumer may exchange programs written by other consumer through different remote fan club web sites and the web site supported by the toy company. Although the toy company and other consumers may post application programs on the web sites, the user friendly nature of easy programming language enables a consumer to modify or fine tune a program, and to replace a program with some personalized sound files or messages before it is down loaded into the toy.

In another business model, a toy company selling a programmable doll product line may release one version of application software every week or every month. Each version will give the doll a different personality. In this case a consumer obtains a different doll every month, or even every week. Since the memory size equipped inside the doll to store program code and compressed digital data representing sound files are always limited, another exciting feature can be provided for this business model by posting a large library of voice messages for each doll on the web site to support a new code release. Another business model allowed by this toy invention is for the consumer to post their own program on the website for exchange or share with other consumers. A consumer may also submit his/her toy program design to the toy company, and help the toy company to prepare for the exciting new personality program release at a later time. Of course the toy company is encouraged to reward a consumer when his/her program is selected.

Other than providing a different personality to a toy at each interval of time, a toy company may release successive growing versions of programs to a doll. This business model enables the doll to grow every week or every month under the control of the toy company. The periodic release of programs is preferred to the method of providing of all different stages of personality programs on a CD ROM because it teaches a child to be patient, and get together with his/her toy of different personality no matter he/she likes it or not, a situation people always face in the real world. It also gives the toy company control on timely feature and quality update of the successive codes to be released during the different time frames.

Another technical problem is to address the periodic release of growing doll concept. This is because not all dolls are bought at the same time. Therefore dolls sold at different time may ask for different stages of the releases. A solution of this problem is to assign a user ID when the user is log into the remote web site. A new user log in the web site is provided the second stage of the release. Subsequent stage of program release is provided month after month, or week after week. The first stage of release is preferred to be factory installed. A real time clock is also preferred for the user programmable toy. This feature further enables the toy to provide interactive functions according to the time of the day or the date of the calendar. Instructions related to real time clock functions are therefore required for the compiling software. Setting the real clock time of the day can be achieved by activating the keypads, or though a program or automatic operation provided by the website when the toy is connected to the web site either through a computer or directly through a modem/dialer.

The parent patent applications introduced keypads, dialing circuit and communication capabilities of controller units that resembled a smart phone. Advanced software features were disclosed for a consumer to write a consumer program with an improved easy programming language, and to download the consumer program to the resembled smart phone. As a result, the smart phone becomes a programmable controller to control interaction of a device designed by the consumer. These consumer programmable features of smart phones are currently not available from the market. This is due to system limitations of the two major mainstreams smart phone/touch pads hosting systems as represented by the iOS system of Apple and the Android system of Google. A critical limitation of the iOS of Apple and the Android system of Google is lack of a consumer friendly software environment; that is required for a non-professional consumer to learn and write a consumer control program with smart phones as controller. It is the objective of the subject invention to provide a system supplementing the existing iOS of Apple, Android system of Google, or any other smart phone/touch pad hosting system popular in the future. This supplemental system is derived from the foundation of parent pending U.S. patent application Ser. No. 10/988,822 filed Nov. 15, 2004 and pending U.S. patent application Ser. No. 11/041,048 filed Jan. 21, 2005. Further significant improvements of software programming environment specific to smart phone/touch pad achieved from the research are disclosed in this application. Because of the high complexity of different models of smart phones/touch pads available in the market and rapid changes of the market condition, a cloud computing system is designed to support the invented system such that programs written by the consumer can be compiled at the cloud, instead of compiling with a full power computer located at the home of a consumer. Currently cloud computing system is not preferred for the application development platforms of iPhone, iPad, Android phones/pads due to the following reasons:

(a) High complexity of the development system required to handle wide variations of professional developers' programming needs;

(b) Requirement of debugging tools to be installed at the office or home of the professional developers;

(c) Inability to offer satisfactory service to professional developers if the debugging tools are relocated to the cloud. Compiling of codes may not be successfully completed at the cloud system due to unexpected reasons. This issue is likely to happen frequently due to high complexity and wide variation of target application programs in the field.

(d) Inability to provide fast real time response as required by some applications, for which fast response is critical.

Although consumer designs/programs are also of wide variation, the easy programming platform offers the following advantages that make cloud computing a preferred choice:

(1) Significantly simpler structure of easy programming language allows consumer to share their programs and discuss their problems with other consumers on line. This unique feature significantly reduce the amount of technical customer support required by the hosting entity;

(2) Due to high program efficiency, size of program written in easy programming language is significantly smaller as compared with program written in other high level languages. This property reduces the time required to upload programs to a cloud computing system.

(3) Easy programming language does not require substantial support of debugging tool. A consumer can easily implement successive rounds of compiled codes testing within minutes. This is a significant advantage enabling cloud compiling as compared with the traditional platform system configured for professional application developers.

There are several possible arrangements for the easy programming platform to be modified for a consumer to program a smart phone/touch pad. The first arrangement is for the smart phone to act as the phone dialer, key pad input selector, speaker and voice circuit and digital camera of the consumer designed system. A control unit having a microprocessor serves as the main controller of the system. Accessory elements such as motors and light bulbs are added to supplement the system designed by the consumer. An alternate more complicated design is to configure the microcontroller of the smart phone/touch pad to serve as the main controller of the system designed by the consumer. In this configuration, codes of compiled consumer program are downloaded to the smart phone/touch pad instead of the control unit of the first arrangement. For the alternate arrangement to work with external accessory elements such as motors and light bulbs, the output data port of the smart phone/touch pad is connected to a decoder, which decodes the output data strings of the smart phone/touch pad into multiple bistable I/O signals, wherein each I/O signal is connected to an external accessory element.

In typical arrangement, the platform system for non-professional consumer to write a program comprises a consumer program compiler, which translates the consumer program into codes executable by the smart phone/touch pad. There are also different ways to design the software development system. In a first arrangement, the platform system for non-professional consumer is provided and maintained by a professional application developer. In this arrangement, the application developer provides a plug in program for a consumer to download into his/her smart phone/touch pad through the application store provided by the hosting entity. The purpose of this plug in program is to direct the smart phone/touch pad to download the compiled executable codes into the smart phone/touch pad. The plug in program also serves the function for the internal processor of the smart phone/touch pad to translate data received through the phone line. Translated codes is then sent to the interface port connecting the external decoder, which further interfaced with the external accessory members of the consumer design. The consumer then writes a consumer program according to the instruction guidelines of the consumer language compiler, such as the easy programming compiler. This program is then compiled at the computer of the consumer, or at a cloud computing system to provide executable codes. The executable codes is then downloaded into the smart phone/touch pad through the plug in program provided herein. In an alternate arrangement, the platform system for non-professional consumer is provided directly by the smart phone/touch pad hosting entity, such as Apple or Google. This is a preferred arrangement that offers the following advantages:

(1) The platform system for non-professional consumer is directly supported by the hosting entity with the internal resources of the operation level software system as well as the resources of the platform system for professional application developers.

(2) Significantly higher efficiency to use the cloud computing resources;

(3) Avoid excessive competition from application developers who compete for the consumer design market, which may result into incompatible consumer programming platform.

In the opinion of the applicant, the optimal system is for the hosting entity such as Apple or Google to provide and maintain the platform system for non-professional consumer; while delegating the accessory elements business to application developers, who supply the consumers building kits of different natures.

Special instructions provided to the enhanced easy programming software enable a consumer to program communication connection between two smart phones/touch pads though the cell phone wireless network. Consumer may program one cell phone as a remote controller to control the motion, interaction of another smart phone/touch pad assembled to form a consumer designed system positioned at a remote location. The remote smart phone is able to send video and audio signal to the controller phone.

The novel features of the invention are set forth with particularly in the appended claims. The invention will be best understood from the following description when read in conjunction with the accompanying drawings.

BRIEF DESCRIPTION OF DRAWINGS

FIG. 1A demonstrated a state table of a program written with the traditional Easy Format;

FIG. 1B demonstrated a path table of an program written with the traditional Easy Format;

FIG. 8 illustrated an embodiment of an accessory member represented by a digital camera having a camera image sensor built-in;

DESCRIPTION OF PREFERRED EMBODIMENTS

Figure 2:
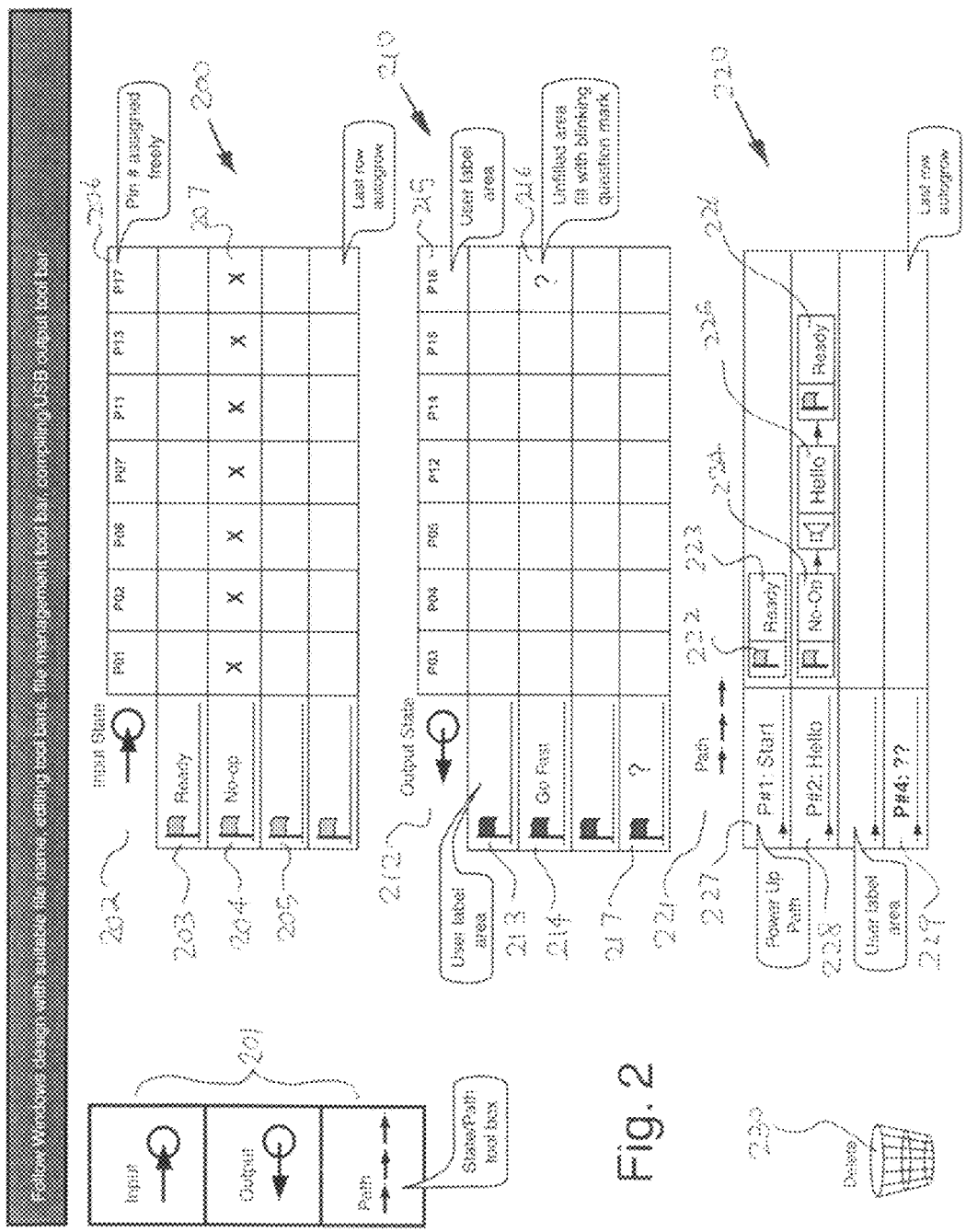
FIG. 2 illustrated a visual form of an improved easy program displayed on a computer screen.

FIG. 1-12 illustrated the fundamental technology and embodiments disclosed in parent U.S. patent application Ser. No. 10/988,822.

Easy Format is an established programming method invented by the applicant as disclosed in U.S. Pat. No. 5,867,818, for professional engineers or programmers to program voice generating microprocessor. This programming method had been licensed by many different microcontroller IC supplying companies and is now an industrial standard for design engineers to program microprocessor ICs used in the design of electronics toys and consumer electronics products. An example of the Easy Format programming software is represented by the programming format of FIGS. 1A and 1B, in accordance with the present invention. The programming format comprises of two fields or tables. The first field is represented by Table 10 comprises of a first co-ordinate 12 listing all the eight I/O terminals and a second co-ordinate 11 listing all the I/O configuration states. Each element of the table represents the configuration of a terminal at a particular I/O configuration state. The first part of the programming process is to specify each element of the table with one of the eight symbols R, F, 1, O, X, H, L, and P as defined. Whenever a terminal is configured as an input terminal, a numbered event is to be specified. This is the event to be executed when a qualified input signal or trigger is received. Element 13 "F:E11" denotes the configuration of terminal 1 (Pin 1) of I/O State#1, whereas "F" denotes that the qualification signal or trigger is characterized by a falling edge, E11 denotes Event#11 is to be executed when a falling edge signal or trigger is received by terminal 1. Element 14 denotes that when a rising edge signal or trigger is detected by terminal 2, Event#2 is to be executed. Element 15 "X" denotes terminal 6 is a don't care terminal. Whenever an input terminal is configured to "X", any trigger or signal received by the terminal is ignored. Whenever an output terminal is configured to "X", the output terminal is configured to have a high output impedance.

Attention is now directed to Table 20, which comprises the second part of the programming format and defines the paths to be executed. A path may comprise of one or more events. Each path or event when executed performs a task such as generating an output signal or trigger, modifying an active I/O configuration state, initiate a timer counter or direct the execution to another path. Table 20 enlists the detail contents of all the paths and events to be executed according to Table 10. Line 21 denotes that the path named Event#1 comprises of three events 22 (STATE#1), 23 (SOUND 1), and 24 (EVENT#1). Suppose I/O State#0 is the active I/O configuration state; the reception of a rising edge signal or trigger by terminal 1 triggers the execution of Event#1; that is, sub-events 22, 23 and 24 will be executed in order. Event 22 denotes that the active I/O configuration state is changed from I/O State#0 to I/O State#1; then follow by the reproduction of the audio signal designated as "SOUND 1". When the reproduction of the sound is completed, sub-event 24 is executed which loop back the execution to "EVENT#1" and replay "SOUND 1" for another cycle. The looping continues until anyone of Terminals 1 to 4 of I/O States#1 receives a qualified signal or trigger. For example, when Terminal 1 detects a falling edge signal or trigger, the "SOUND 1" looping of Event#1 is interrupted and Event#11 is executed. Event#11 instructs the controller to return to I/O State#0 as the active I/O configuration state and the "END" symbol denotes the end of the event and the control apparatus is in an idle mode awaiting the next qualified input signal or trigger to be received as defined by I/O State# 0.

At the power up of the control apparatus, an I/O configuration state is to be defined as the default power up I/O state; that is, the active I/O configuration state right after power up of the control apparatus. A convenient notation is to define I/O State#0 to be the default power up I/O state.

It should be noted that each I/O configuration state has no sequential relationship with each other and table 10 can be arranged in any order. Similarly, any path listed in table 20 also has no sequential relationship with another path unless it is designated as the event of another path as in Line 21. The paths can be numbered in any order and the numbers can be skipped if desired by the programmer. All events having sequential relationship are arranged in a single path line listing. This arrangement enables the programmer to have a much clearer picture of the program when compared with the multiple lines listing of regular assembly language programming.

Although the program table of FIG. 1 is organized into two fields as described, various modifications in format structure of the programming tables are possible while maintaining the simple to learn and easy tracibility nature of the invented programming method. Since the traditional form of Easy Format has already been an industrial standard for professional engineers and programmers, reference instructions had been published by U.S. Pat. No. 5,867,818 and disclosed to Easy Format licensees in the public domain after the filing date of the U.S. Pat. No. 5,867,818, further in depth description of the traditional Easy Format software is not provided in this application. In summary, easy programming language is a programming language, or a programming software that enables a user to program a microprocessor IC or a controller unit to interact with hardware/software triggers or external circuitry.

Since traditional Easy Format programming language are designed for electronics engineers and professional software programmers of toy companies and field service engineers of microprocessor IC companies to replace assembly language in tech toy designs, the structure of the programming language is still quite technical oriented. Majority of the instructions of the traditional Easy Format programming language were derived from technical terms directed to structure of sound generating microprocessor IC. Accordingly significant improvements of the traditional Easy Format programming language had been researched. Achievements of this intense research were described in the parent application U.S. patent application Ser. No. 10/988,822 and FIG. 2-12 of this application. These technical improvements completely reshape the looking, features and computing environment of the traditional Easy Format programming language. The redesigned features presented in FIG. 2-12 allows the easy programming language to become acceptable by the non-professional consumers, such as the non-technical users targeted by the hobby design kit of parent U.S. patent application Ser. No. 10/988,822. The technically enhanced easy programming language also provides opportunity for non-technical consumer to write program for programmable toys as disclosed in parent U.S. patent application Ser. No. 11/041,048 quoted herein. FIG. 16-23 demonstrated further technical improvements of the parent application Ser. Nos. 10/988,822 and 11/041,048 to include the hobby design kit with cell-phones/touch pads, particularly the technically advanced smart phones/touch pads; such as the iPhone and iPad of Apple Inc. and Android phones and pads supported by Google Inc. The technical improvements illustrated in FIGS. 2-5 and 21-22 only provided typical examples of the improvements in the non-professional consumer oriented programming environment, implementation of these improvement features into a working compiler were determined to require multiple thousand engineer hours of programming research and multiple thousand lines of test codes. Because of the high technical complexity of smart phone/touch pad and the cloud computing system recited herein, further technical challenges were studied before the improved features of the subject application were determined to be technically feasible. The disclosure of this application is therefore focused into describing the novel features of programming environment improvement, the system relationship of the invention as well as embodiments of the novel products, so as for a person having ordinary knowledge in the art to quickly understand the novel characteristics of the subject invention as well as the new applications currently not available from the market.

Attention is now directed to FIG. 2, which illustrated a significant enhancement of the traditional Easy Format software. User-friendly symbols and graphic labels are provided on a computer screen to facilitate composing an "easy program"—software application program written with the invented easy programming language. Buttons 201 is a pull down menu to obtain labels of input state, output state or path elements. The sign 202 indicates that the table 200 is an input state table. The label 206 indicates the location of the input ports or pins of the controller unit. Labels 203 to 205 are provided a special sign or specific color to signal that they are input states. When the state 204 named "No-op" is activated, all the ports P01 to P17 are set to "X", it means all these ports entered into a "don't care" state. The sign 212 indicated table 210 is an output state table. The label 215 indicated the location of the output ports or pins of the controller unit. Labels 213, 214 and 217 are provided by a different sign or different color (as compared with the label of the input states) to indicate that these label direct to output states. Elements 216 and 217 are provided with a blinking question mark to alert the consumer that an entry is missing or an error had been entered. The sign 221 indicates that table 220 is a path table, which describes the events to be executed when a path is called. Element 227 is a path #1 having a consumer assigned path name "start". When this path is executed, the input state is set to be active as indicated by the sign 222 and label 223. When the path 228 is activated, three events 224 to 226 will be executed in order. Event 224 set the input state No-op to active. Event 225 generates a voice "Hello". Event 226 deactivate the no-op state 204 and set the input state 203 Ready to active.

Figure 3:
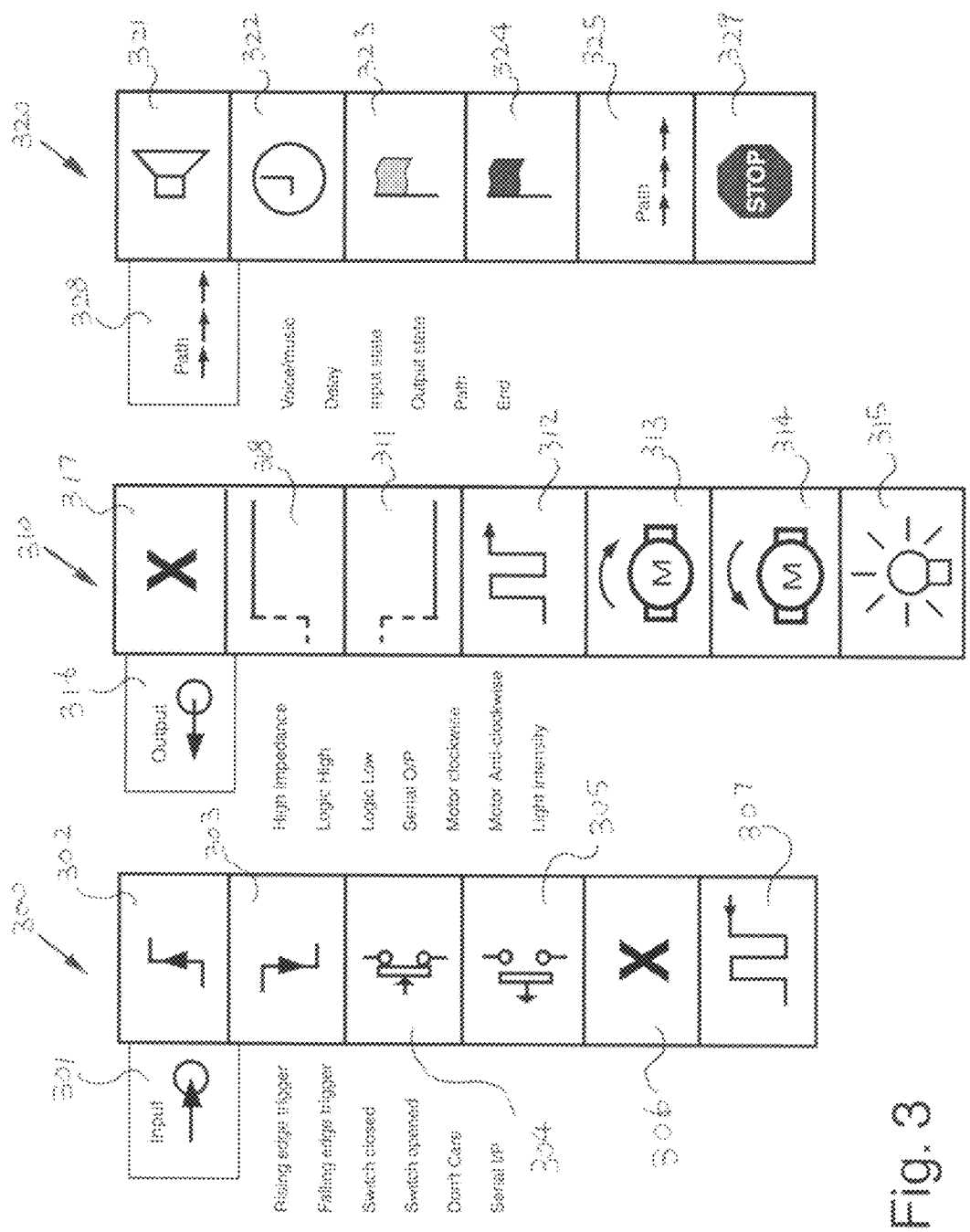
FIG. 3 demonstrated the graphic symbols designed in the improved version to represent inputs, outputs and nature of the path equation elements in an improved easy program.

Attention is now directed to FIG. 3, which provides the options available when an element of pull down menu 201 of FIG. 2 is triggered. Table 300 illustrates the signs 302 to 307 each represent a different qualifying condition for an input port to be triggered. For example, label 302 indicated that the port is triggered when a rising edge signal or trigger is detected. Label 303 indicates a falling edge trigger command. Label 304 indicates the port is triggered when a switch is closed. Label 305 indicates the input port is triggered when a closed switch is opened. Label 306 defines a "don't care" condition ignoring any input trigger from the hardware/software input, point, port, pin, or channel. Label 307 indicates the port is inputting a serial pulse and the qualifying condition depends on another predefined condition of the serial data received.

Table 310 represents the pull down menu of output ports. Label 317 indicates the output port is set to high impedance. Label 318 indicates the port is set to level high. Label 311 indicates the port is set to level low. Label 312 indicates the port is set to the configuration of a serial output port and the serial data to be sent will depend on the event to be executed. Label 313 indicated that motor control is connected to this port and the motor is instructed to turn clockwise. Label 314 indicates that the motor is instructed to turn anticlockwise. Label 315 indicated a light transducer is controlled by this hardware/software output, point, port, pin or channel and the light is turned on when this port is set. There are also labels not shown in the table to turn off motor or lighting devices. Table 320 indicated the common labels to be used in a path, which executes a series of events according to the program. Label 321 indicated a sound is to be generated. Label 322 indicates a delay time is required before the next event is executed. Label 323 indicates an input state is to be set active. Label 324 indicates an output state is to be set active. Label 325 indicates the program is going to jump to another path. Label 329 indicates the program will be put to stop and wait for another input trigger to activate another event path. Label elements of these pull down menu can be drag and drop to the appropriate location of the state and path tables during composing of the user-friendlier Visual Easy Format program.

Figure 4:
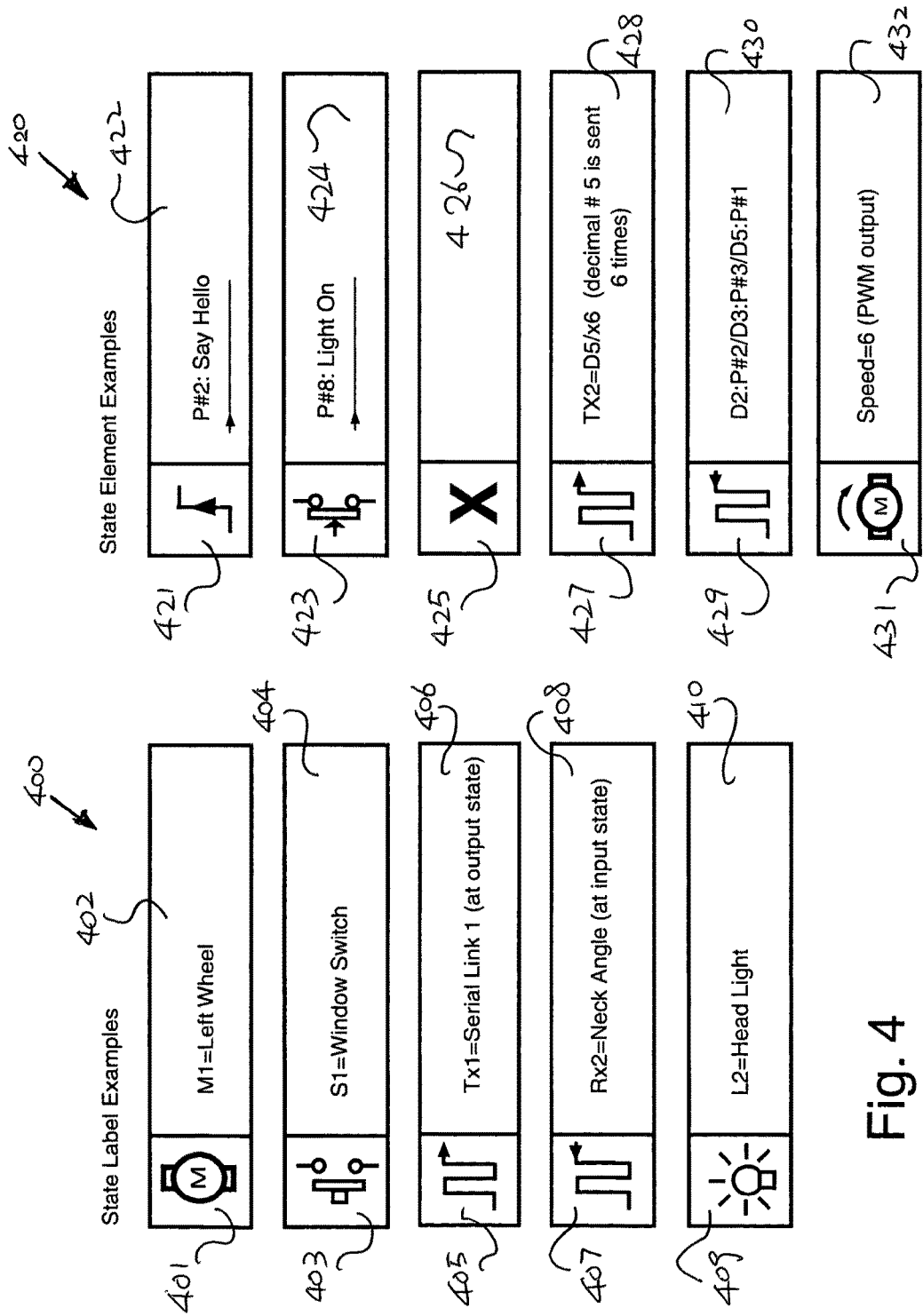
FIG. 4 demonstrated examples of labels to be used in State table of improved visual easy programming.

Table 400 of FIG. 4 indicates the consumer-defined information to be filled after a state label is drag and drop to the appropriate location of a state table. Label 401 is a motor label obtained from the pull down menu. The consumer writing the program is then required to define the name of the motor. In this case the consumer defines this motor to be motor #1 representing the motor to drive the left wheel. The consumer also defines the label 403 to be the window switch S1 when he is making use of the building kit to design and build a home security system. Similarly, all the labels 405, 407 and 409 are defined with appropriate consumer defined names. Table 420 indicates the actions to be performed, the path to be executed or the parameters to be set when a qualified signal or trigger is received. For example, when label 421 is activated, Path #2 having a name "Say Hello" is executed. When label 431 is activated, the Motor M2 is set to run at speed setting #6, as controlled by pulse width modulation.

Figure 5:
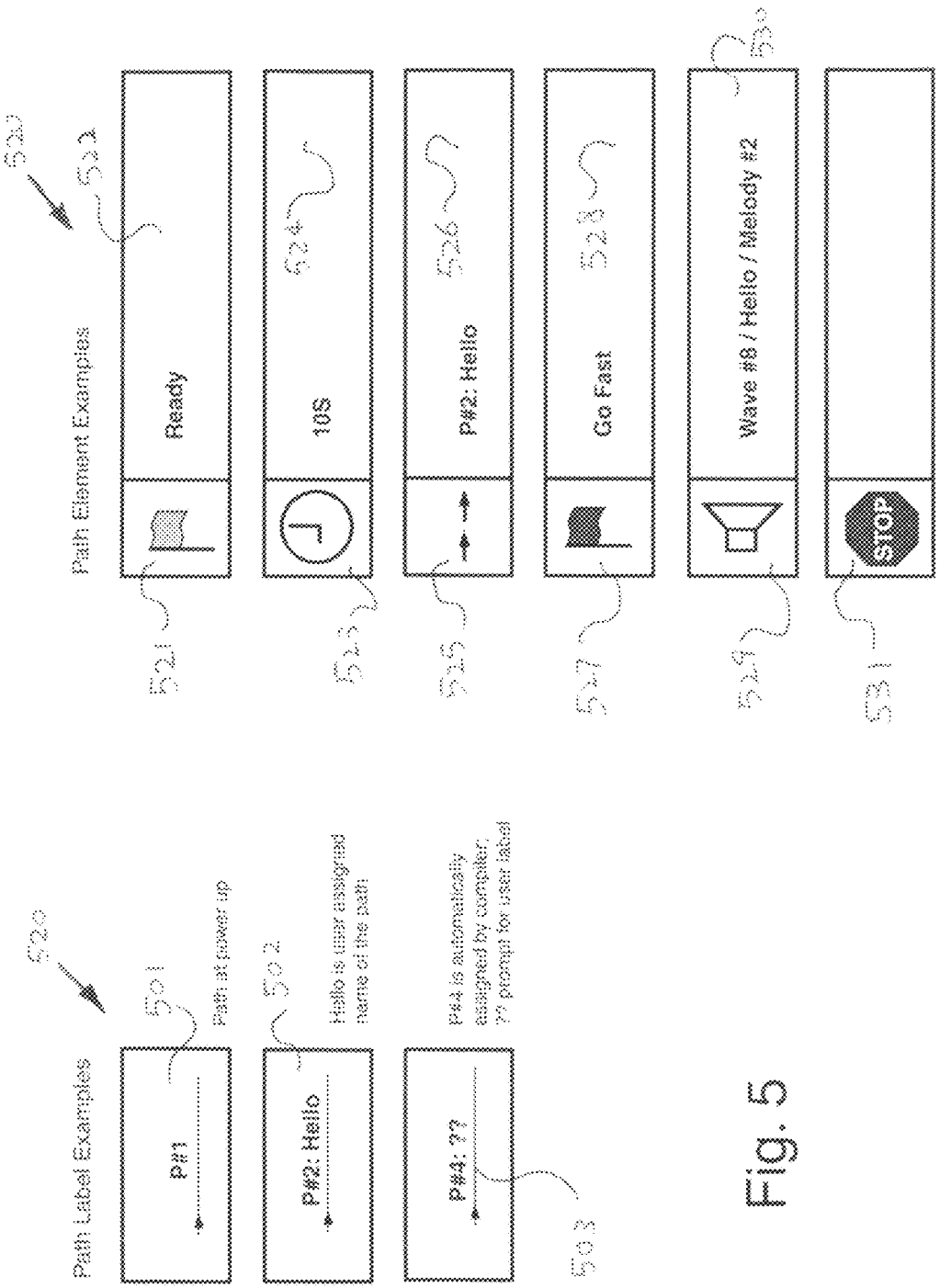
FIG. 5 demonstrated signs and labels used in Path table of improved visual easy programming.

Table 500 of FIG. 5 indicates the path label examples. Label 501 indicates a power up default path P#1. This is the default path to be executed during power up. If the consumer forgot to define a path, blinking question mark will prompt the consumer to fill in the path name or to delete the path from the path table. A path can be deleted by dragging and dropping a path label to the recycle bin 230 of FIG. 2. Table 520 indicates examples of defining the event provided in a path equation. Labels 521 and 522 will set the state named "Ready" to become active. Label 523 and the data 524 will trigger an event to delay for 10 seconds. The symbol 529 of speaker represents an instruction to produce a voice and the voice produced by the path 529 are defined to be a wave file, a hello voice and a melody. Accordingly label 529 will generate three sounds "Wave #8", the "Hello" voice file and the "Melody #2" file respectively. Similar in technique to provide the instruction represented by a speaker sign of label of 529 to output a voice or sound, another instruction provided by another predefined sign is provided to output graphic or message to the display 1226 of FIG. 12.

Figure 6:
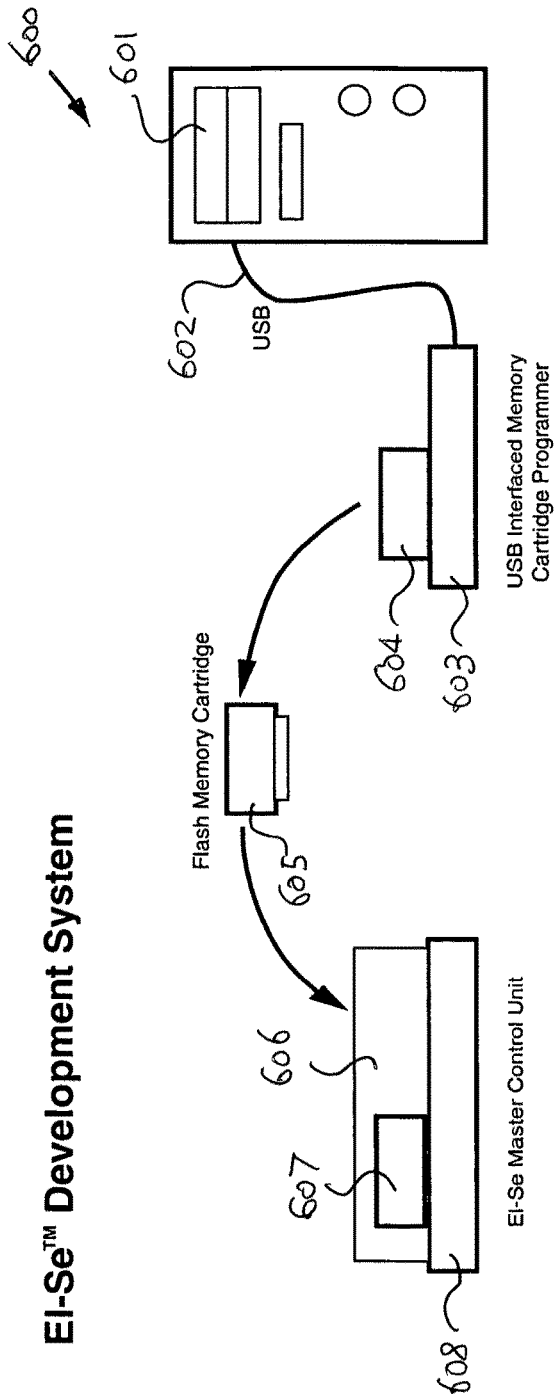
FIG. 6 illustrated an embodiment provided for a user to compile an improved easy program and download the controller unit executable codes into a flash memory.

Attention is now directed to FIG. 6, which illustrated an embodiment for a consumer to compile an easy program and to down load it to the controller unit of the building kit. The easy programming language compiler is installed in the computer 601. After an easy program written by a consumer is compiled, the executable machine code data is programmed to a flash memory module 604 inserted to a programmer 603. The programmed flash memory cartridge is removed and represented by the cartridge 605. This cartridge becomes 607 when plug into the controller unit 606.

Figure 7:
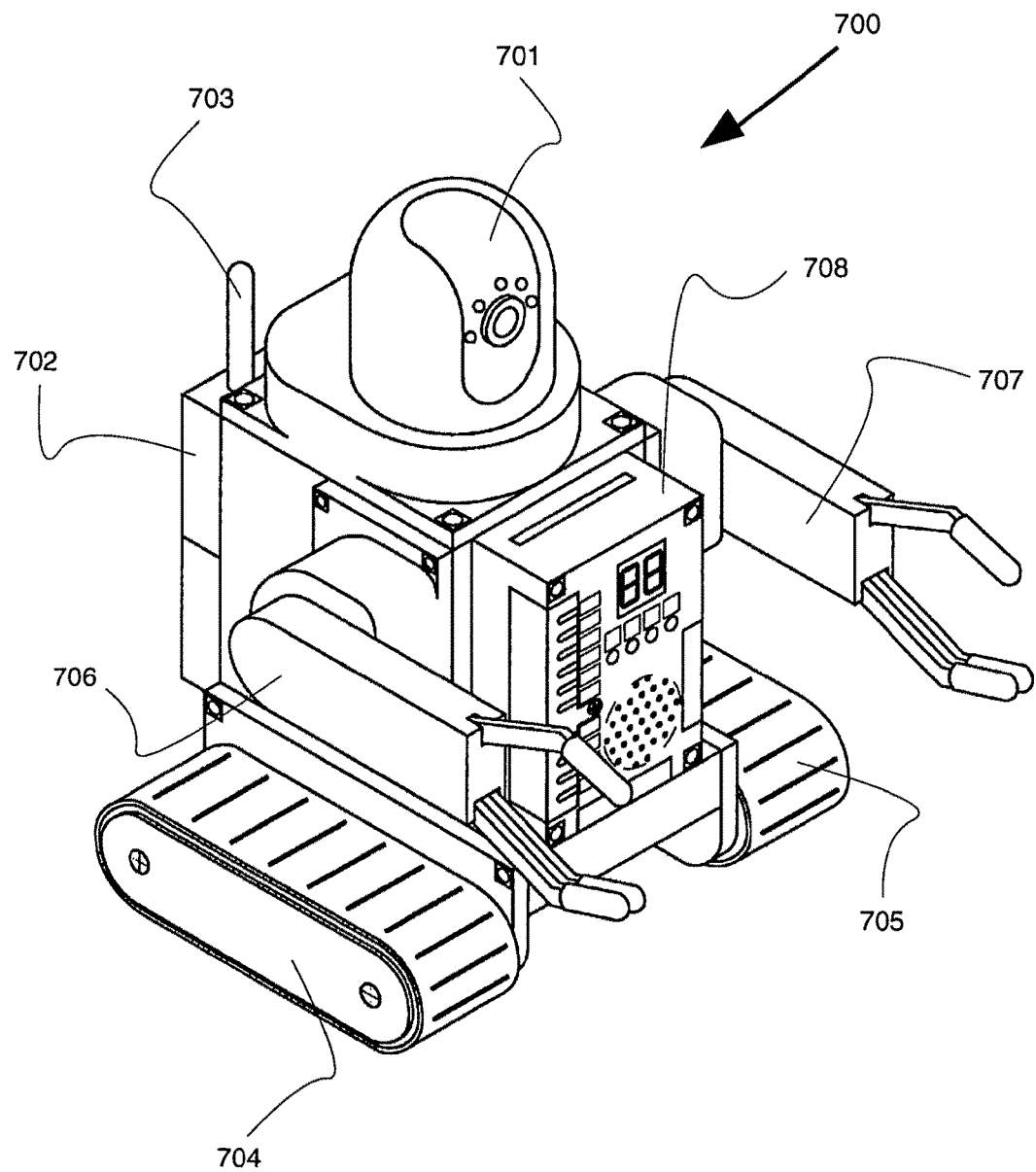
FIG. 7 demonstrated a robot built with components of the retail building kit invented.

700 of FIG. 7 illustrated a robot, which represents an exemplary embodiments designed by a consumer. The robot comprises a controller unit 708. Two motorized belt drives 704 and 705 to provide motion. Two robot arms 706 and 707 are provided to represent the arms and hands of the robot. At the head of the robot is a digital camera 701. At the back of the article is a RF (radio frequency) module 702 equipped with an antenna 703. This RF module is provided to transmit the video signal picked up by the robot and also to receive commands from a remote wireless control member operated by the consumer. All the robot arms 706, 707; the video camera module 701, the motorized belt drives 704 and the RF module 702 are all examples of the group of accessory members provided with the retail building kit for consumers to assemble or build their designs such as the robot of FIG. 7. According to a person having ordinary knowledge in the art, the plain or ordinary meaning of the term "building kit" is defined as a collection of components enabling consumers to build articles designed by them. According to a person having ordinary knowledge in the art, the plain or ordinary meaning of the term "retail" means the components are packaged for retail purpose, or the components are distributed through retail channels to reach the consumers. It should also be noted that all the accessory members of this robot project are mounted on a piece of solid wood block in the shape of a cube with screws. The reason to use wood as the core anchor material is easy availability, low cost and easy to shape.

Figure 8:
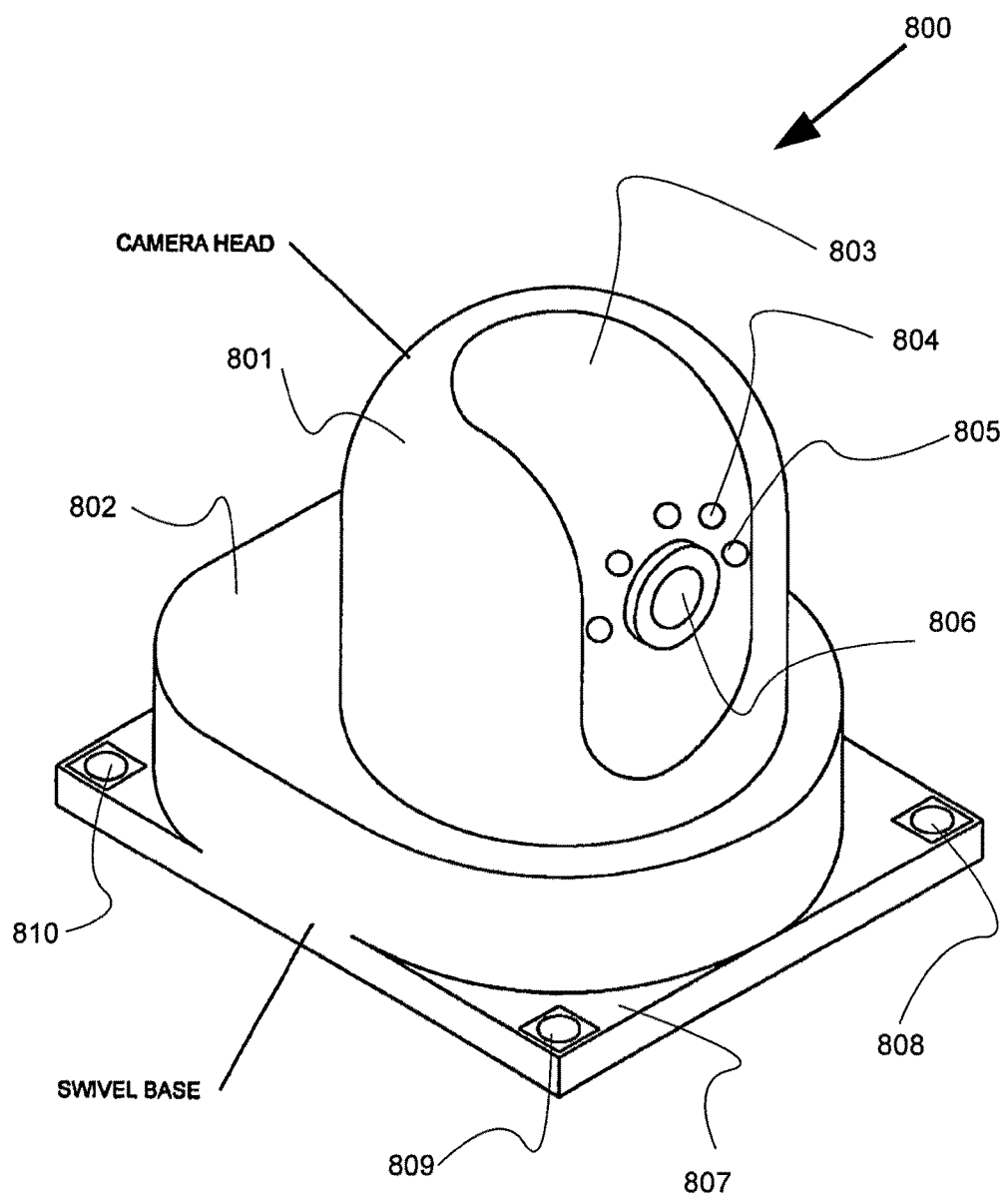
Figure 9A:
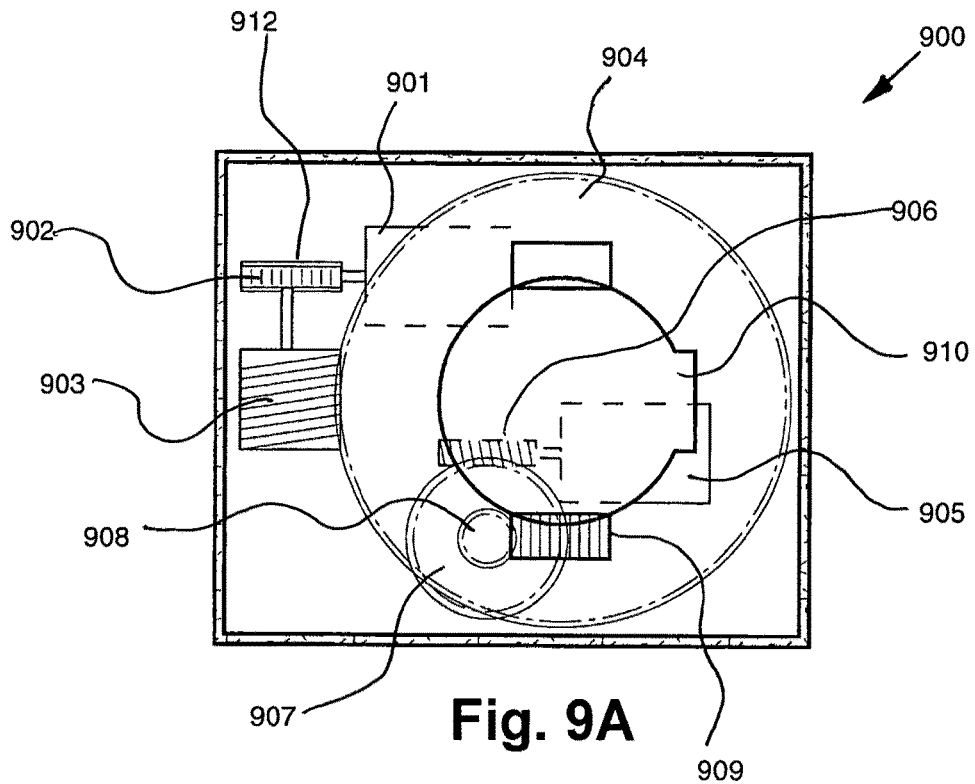
FIG. 9A illustrated the top see through view of the digital camera accessory member embodiment.
Figure 9B:
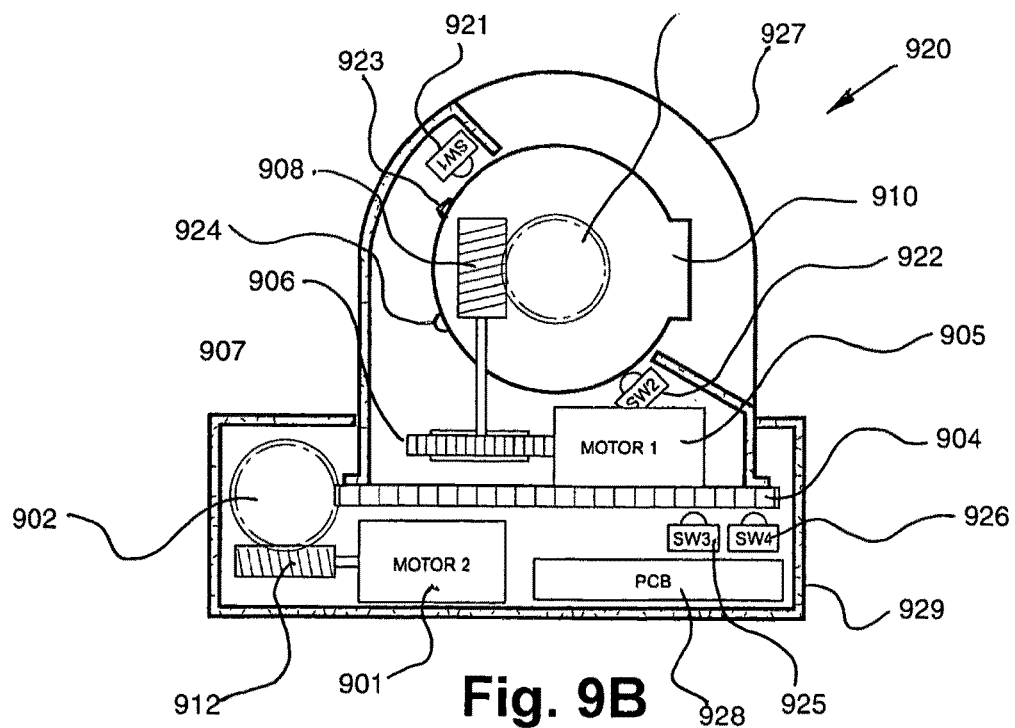
FIG. 9B illustrated the side see through view of the accessory digital camera embodiment.

FIG. 8 illustrated an enlarged view of the digital camera 701 of FIG. 7. The lens 806 and the optical sensor or image sensor located behind the lens picks up the image. Lighting sources 804, 805 provides supplemental lighting when the article is operated in a dark environment. Inside the housing 801 is a movable subassembly 803 for the camera to pan and tilt against the base 807. Mounting holes 808 to 810 are provided for the camera to be mounted to the wood robot body. FIGS. 9A and 9B demonstrates the internal structure of the digital camera. The motor 905 and gears 906, 907 908 and 909 provide the tilt motion. The motor 901 and the gears 912, 902, 903 and 904 provide the pan motion. Limits switches 921, 922 and bumps 923, 924 provide feed back signals to prevent the camera tile mechanism from exceeding the movement limits. Switches 925 and 926 provide protection to the pan mechanism. Behind the lens area 910 is the light sensor to provide image signal, such as the CCD or CMOS image sensors used in digital cameras. In order for the controller unit to communicate with this digital camera accessory member, numerous signal and power wires are required to provide power, pan and tilt signals and to received data representing the video image picked up. This real time work load may be excessive to the microcontroller IC located inside the controller unit because it needs to communicate with the motorized belts, the four motors of the robot arms, the two motors of the camera module and the four limit switches all together at real time. In order to reduce the work load of the controller unit, a smaller microcontroller separated from the main controller is provide on the PCB 928 to directly control the motors and limit switches of the camera module. With this design, the controller unit is required only to send brief pan and tilt commands to the microcontroller located inside the camera module.

Figure 10:
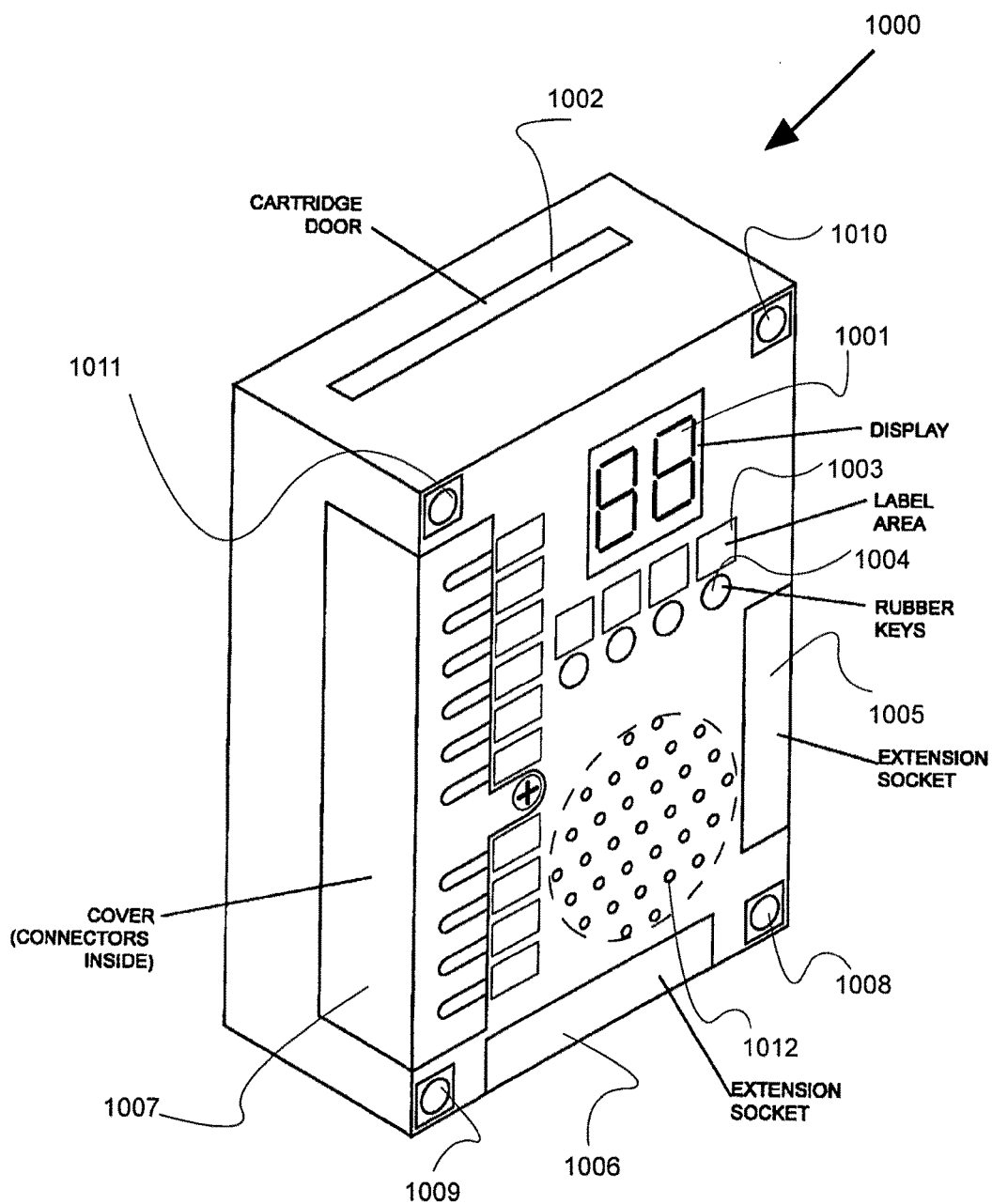
FIG. 10 illustrated an enlarged external view of an embodiment of controller unit.
Figure 11:
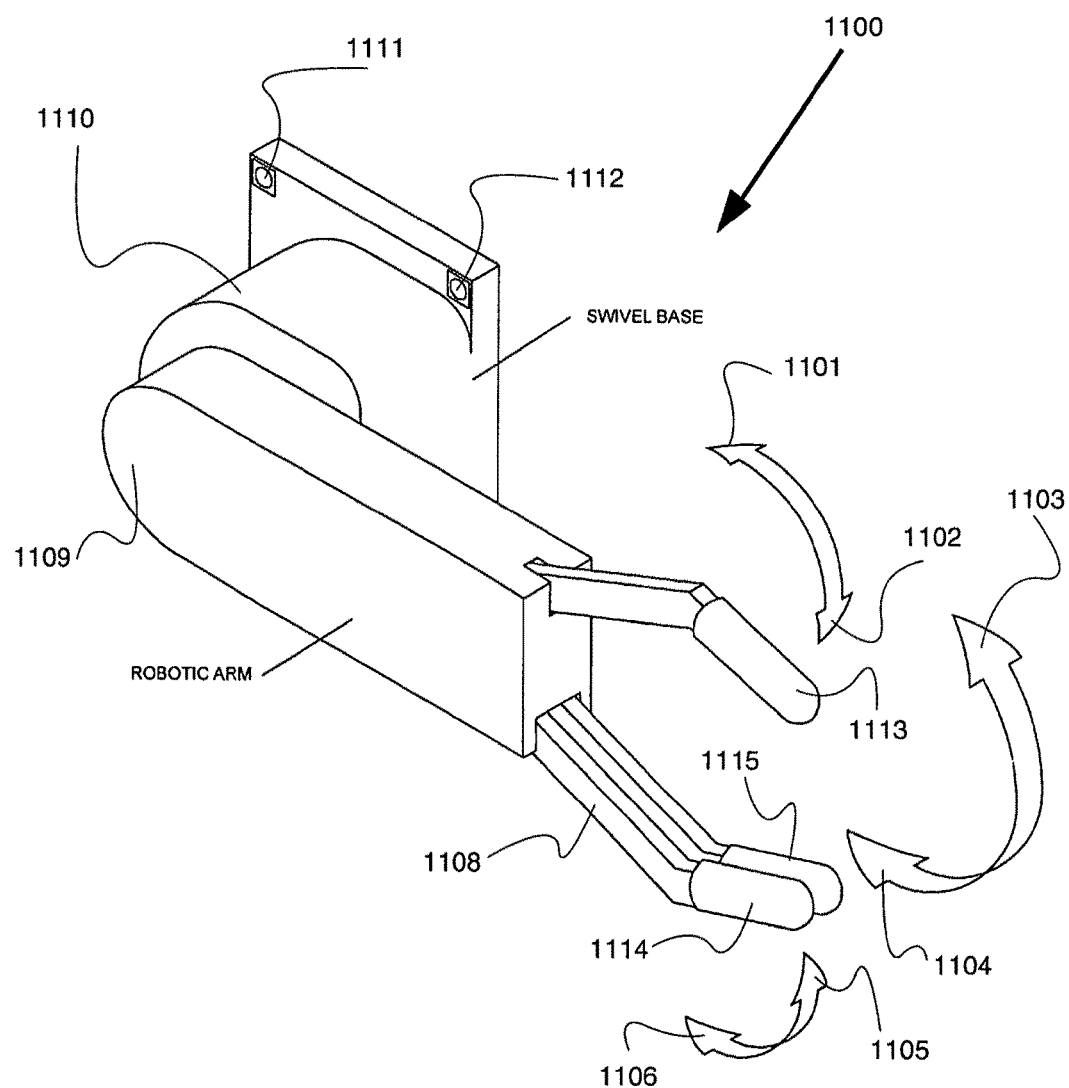
FIG. 11 illustrated the motional directions of another accessory member representing a robot hand.

FIG. 10 illustrates a simple version of the controller unit 1000. At the front of the unit are two seven segments display 1001; four push button trigger switches 1004, switch label area 1003. Connector sockets and batteries hide inside the cover 1007. Extension sockets 1005 and 1006 enables the controller units to provide more input/output, points, ports, pins or channels. A speaker is provided behind the grill 1012. Located at the four corners are the mounting holes 1008 to 1011. The slot 1002 is provided for the controller unit to receive programmed data from the computer where the Easy Format program is compiled. It should be noted that the two digits LED display may be reduced by high-density LCD panels for a better controller unit model. FIG. 11 demonstrated a motorized arm and hand assembly. One motor and gear assembly is provided to rotate the arm 1109 against the base 1110 towards the 1103 and 1104 directions. A second motor and gear assembly is provided to move the fingers 1113 to 1115 in the 1101, 1102, 1105 and 1106 directions. Similar to the pan and tilt mechanism of the camera module, clutch or limit switches are required inside the motorized arm mechanism to limit the traveling of the mechanism. It is also preferable to provide another microcontroller inside the arm assembly to control the two motors and the four switches. This design also allows the motorized arm assembly to communicate serially with the controller unit and therefore reduces many wires to be connected between the two members.

Figure 12:
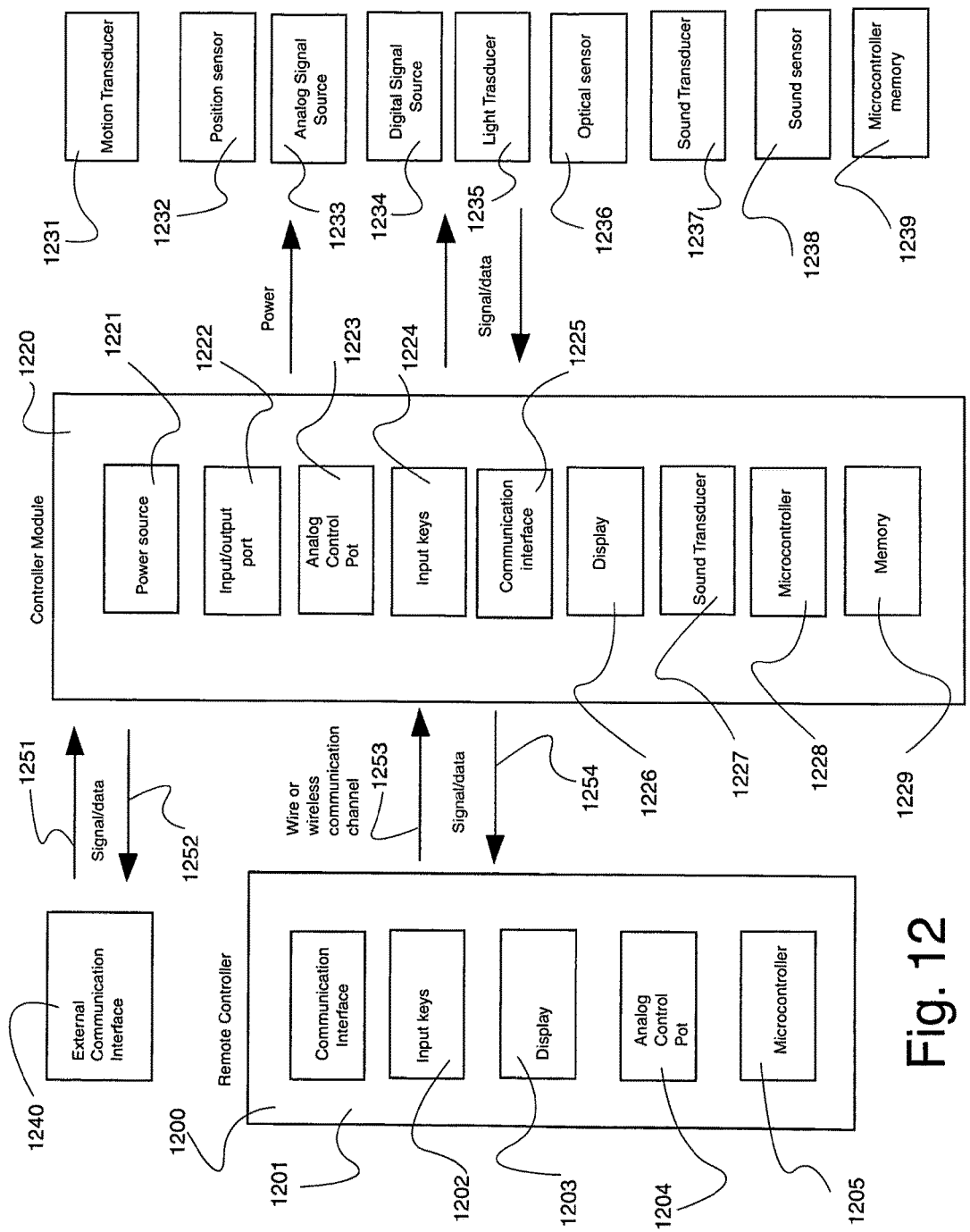
FIG. 12 demonstrated the block diagram of an embodiment of the building kits invented.

Attention is now direct to FIG. 12, which illustrated a block diagram of the preferred embodiment of a complete building kit system. The controller unit 1220 may comprise input/output, points, ports, pins or channels 1222; analog control potentiometer 1223; input key switches 1224 located at the front of the controller unit; communication interface 1225 enables the controller unit to communicate through a remote control member 1220, or with external communication interface 1240, such as DSL, cable modem, telephone line or wireless cell phone channels to get in touch with a remote electronics device, such as a remote mobile phone or a remote computer, or a remote server. A LED or LCD display panel 1226 is preferred for the control unit to provide interactive display of image or messages. Alternately the display panel may locate at an external accessory unit for displaying graphic or message information. A sound transducer or speaker 1227 provides voice, music and sound effects. The core of the controller unit is the microcontroller 1228 and the programming memory 1229. The microcontroller 1228 is typically represented by a microprocessor IC or a module having a microprocessor IC. Power source 1221 of the article may be positioned outside the controller unit or contained within the controller unit 1220 as illustrated in FIG. 12.

The controller unit 1220 is connected with one or more accessory members by the consumer. Typical examples of the accessory members are the motion transducer 1231 such as motors and solenoid; position switches or sensors 1232; analog signal source 1233 to provide analog video signal, voice signals or other ambient signals; digital signal sources 1234 such as encoded voice signals or other digital messages or data; light transducers 1235 such as light bulb and LED; optical sensors or camera image sensor 1236; sound transducer 1237 such as peizo vibrator or speaker; sound sensor 1238 such as condenser microphone. Passive accessory members include any structural components required to build the article. As discussed previously, local microcontroller and memory 1239 are preferred to be included in the structure of may different kinds of accessory members to reduce the workload of the controller unit and to reduce the number of connecting wires required.

In order for a consumer to effectively communicate or to send commands to the controller unit, a remote control member 1200 is added to the system. This remote control member is connected to the controller unit by cable, wire or by wireless method such as radio frequency, infrared, or ultrasonic communication designs. The remote control member may also be equipped with a LED or LCD display panel or speakers for obtaining interactive audio/visual communication with the controller unit. Typical remote controller comprises communication interface circuit 1201; input keys 1202; display device 1203; analog control potentiometer 1204 for providing digital proportional controls such as that required by a servo mechanism and a microcontroller 1205. In another application sample, the remote control member can be represented by a mobile phone. In this case the building kit will require a dialing circuit and/or a modem circuit to communicate with the wireless phone. This dialing and/or modem circuit may be installed inside the controller unit or positioned externally as an external accessory member. Similar to the controller unit, a label area is provide for a consumer to define and label the function of the blank input keys according to the nature of the article designed, built and programmed by the consumer. It can be further observed from FIG. 12 that the controller unit is preferred to provide two directional signal interface, either by serial data link or by parallel ports with the remote control members, some of the accessory members and also with the external communication terminals such as phone line, cable line, modem or wireless communication channels. However, power supply feeding to the accessory members is usually arranged in one direction.

Figure 13B:
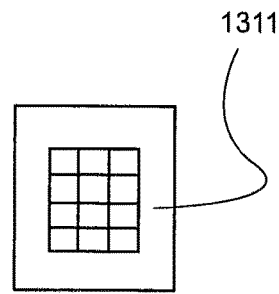
FIG. 13B illustrates a key pad for a user to control a programmed toy article.

FIG. 13-15 direct to the disclosure of another parent U.S. patent application Ser. No. 11/041,048 filed Jan. 21, 2005. This application disclosed embodiments of consumer programmable devices in the toy field, which uses services of a remote computer or web site to service a local consumer programmable toy article. This application system resembled a proto cloud computing system of the invention.

Figure 13C:
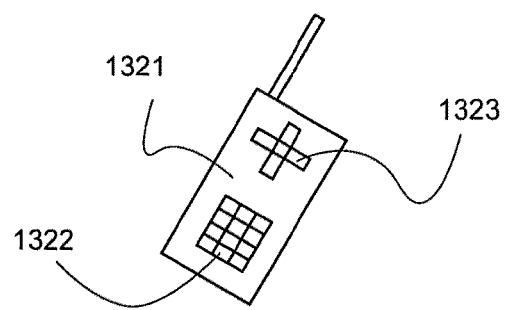
FIG. 13C illustrates an embodiment of a remote controller for controlling a programmable toy article.
Figure 13A:
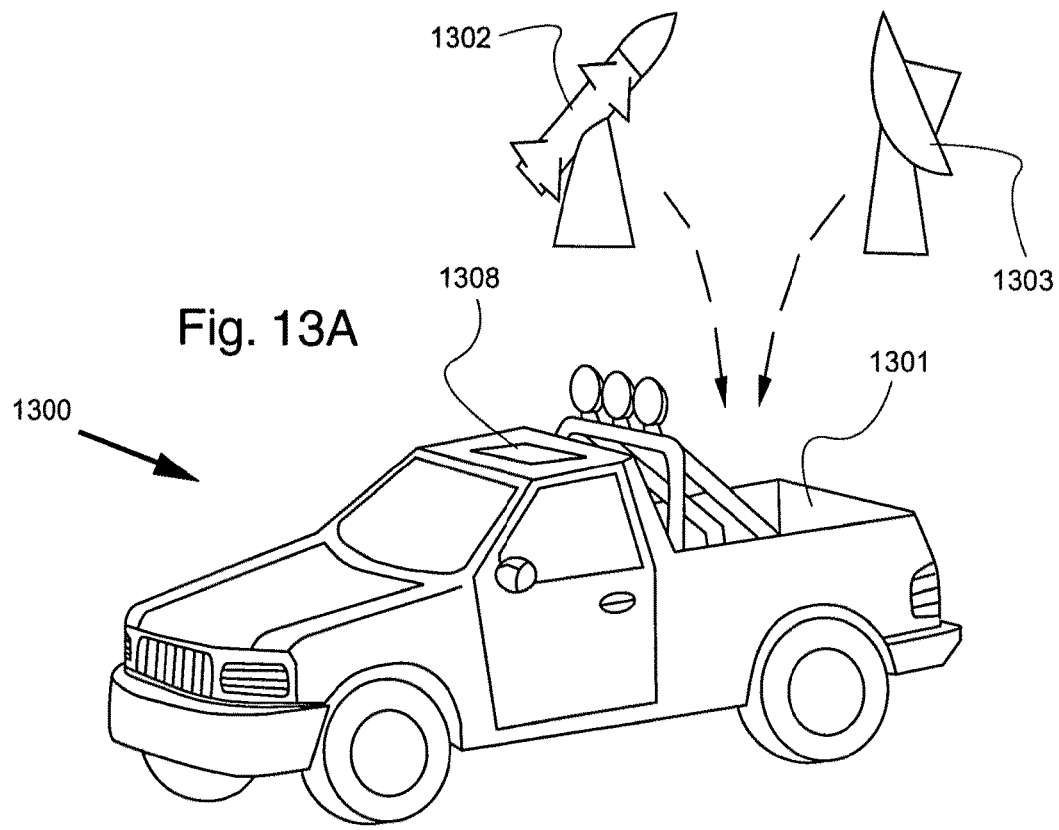
FIG. 13A demonstrated a master toy member represented by a vehicle to work with different accessory toy members, each having an identification component.

FIG. 13A indicates another preferred feature of a programmable toy vehicle. The motor vehicle that represents a master toy member 1300 is provided with a set of accessory toy members 1302 to 1303. Inside the trunk 1301 of the motor vehicle 1300 is a receiver, which detects an identification signal of the accessory toy members 1302 to 1303 when any of the accessory toy member is placed inside the trunk 1301. Upon receiving an identification signal, the microcontroller provides a response related to the identified accessory toy member according to the program flow of program composed by the consumer. A wired or wireless design can be provide inside each accessory toy member for providing the identification signal required. Typical example of wired or contact type of identification design is to provide an integrated circuit inside the accessory toy member to send out an identification signal when a contact is made between the master toy member and the accessory to member. A simpler design is to provide a resistor of specific value inside an accessory toy member. The master toy member is provided a circuit to measure the value of the resistor so as to identify the nature of the accessory toy member making the contact. Alternately, a wireless circuit such as a RFID can be provided to achieve wireless identification effect. In another preferable design, a key pad 1311 of FIG. 13B can be provided on top of a programmable toy article to provide interactive response or directing different play modes by the consumers after the toy article is programmed. In the exemplary embodiment of 1300, this keypad can be positioned at the top of the motor vehicle as shown in the position 1308. There are different kinds of keypad designs. A preferred design according to the nature of this invention is the numerical keypad design similar to that of the telephone. This keypad is particular useful when the toy article is programmed to provide different kinds of sequential actions, or play modes when a key, or a key sequence is entered. For example, when the key #6 is entered, the motor enters a rescue mode, which rushes the vehicle into a series of panic motions and sounds. When the key #9 is entered, the motor vehicle enters a diagnostic mode. Each of the motors is momentarily turned on in clockwise and reversed directions for trouble shooting of the motor related mechanism. Each of the lights can also be sequentially turned on and off to show that all the lights are working properly. Many other features can be programmed into the toy according to the wish of the consumer. For example, when a predefined sequential code 12321 is entered into the keypad, the toy vehicle can be programmed to enter a lock mode so that no other people can play with the vehicle unless another secret release code is entered into the keypad.

Although a keypad allows the consumer to provide many different unusual functions for different sequential controls or play mode selections according to the program written by the consumer, a remote control circuit adds more fun to the programmable toy. FIG. 13C illustrates an example of a remote controller which sends control signals to the remote control receiver provided inside the vehicle 1300 of FIG. 13A. For example, the consumer may program the vehicle to change moving direction when signals reflecting the direction control keypad 1323 of the remote controller 1321 is received. Alternately numeric keypad 1322 of the remote controller may be used to substitute the keypad 1311 installed on the motor vehicle for providing different programmed controls.

The signals received from the remote controller can also be programmed to provide many different kinds of exciting play modes. For an example, the motor vehicle 1300 can be programmed to provide many different play modes; each play mode represents a different play pattern or sequence of light sound and motion. These play modes designed by the consumer can be selected by pressing a specific key of the keypad. When the vehicle is performing a preprogrammed play mode sequence, the microcontroller inside the vehicle can be programmed to continue to receive remote control signals. A remote control signals received can be programmed to override the original sequential control program flow. This special design added unusual value to the preprogrammed toy. For example, another toy vehicle equipped with special stunt action capability can be selected to perform a preprogrammed sequence of stunt show action #5 (by selecting the keypad #5) on a playground near a pool. When the vehicle is getting too close to the pool, the consumer can use the remote control to interrupt the stunt show #5 performance and steer the vehicle to a safe location before the stunt show performance resumes.

Figure 14A:
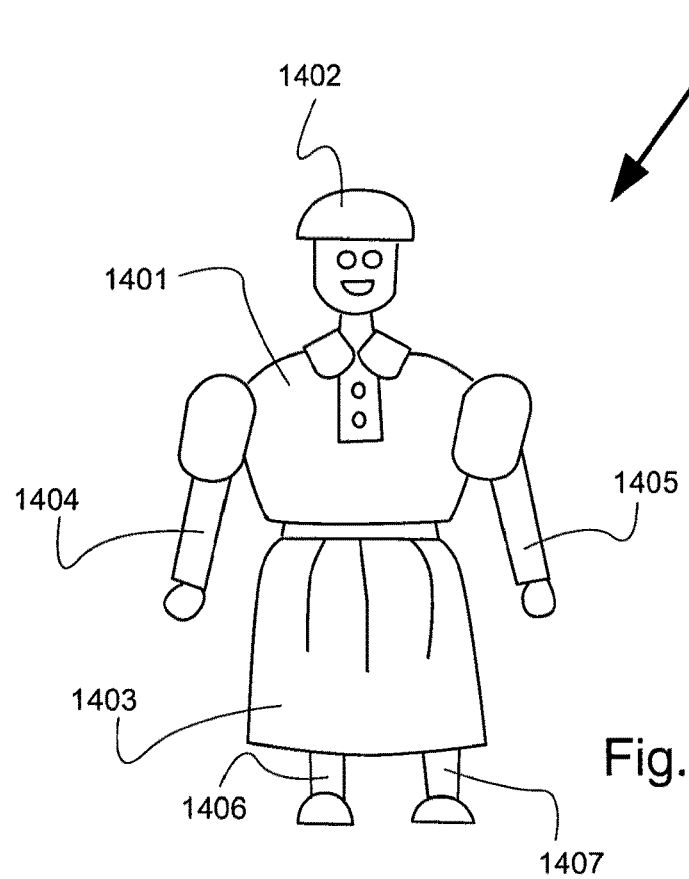
FIG. 14A illustrated a user programmable doll.
Figure 14B:
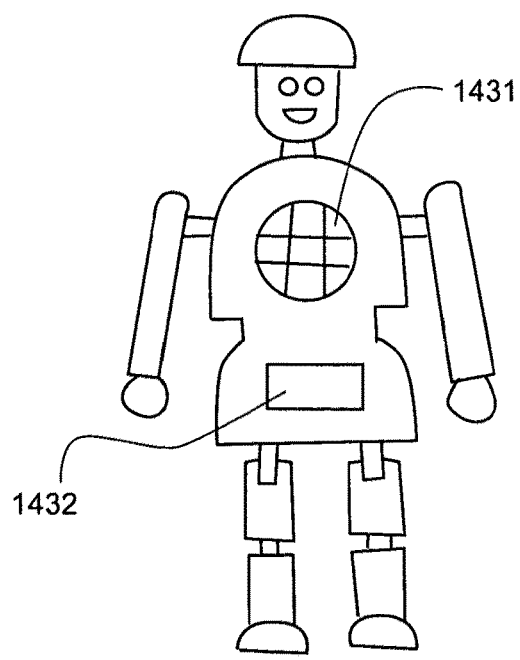
FIG. 14B illustrated a user programmable robot, or the inside view of the user programmable doll of FIG. 14A.

Attention is now directed to FIG. 14A which illustrates another consumer programmable toy provided in the shape of a doll 1400. The doll has a head 1402, an upper torso 1401, a lower torso 1403, upper limbs 1404, 1405 and lower limbs 1406 and 1407. FIG. 14B shows the inside view of the doll when the cloth is removed. Motorized mechanisms are included to provide motion of the head and the limbs against the torso, and also between the upper and lower torsos. Position sensors can be provided to generate signals when a consumer moves the limbs or head of the doll. Additional sensor switches such as a big push button switch 1432 can be provided at different locations of the torso. A sound transducer, represented by a speaker 1431 is included to provide sound responses. All the motor control circuits and sensor signals are connected to the microcontroller installed inside the doll. Voice and sound files related data are also stored inside the memory of the microcontroller circuit. A compiler program is provided for the consumer to compose a program that provides interactive sound and motion responses when a sensor signal is received.

Figure 15A:
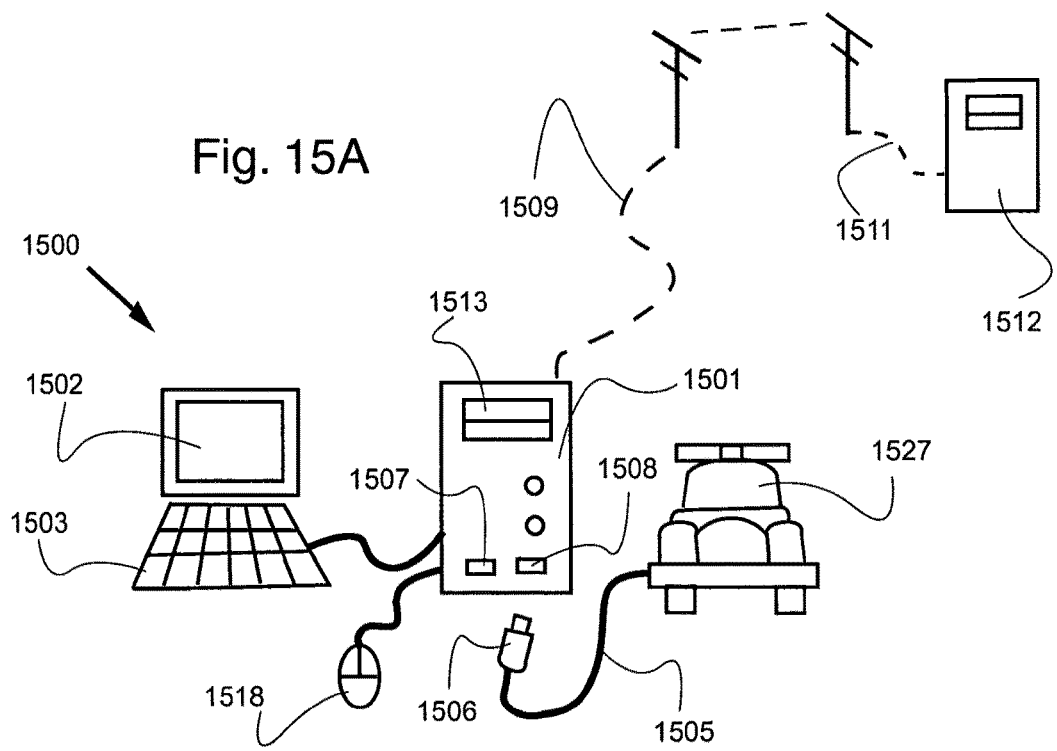
FIG. 15A illustrated a setup to program a consumer programmable toy.
Figure 15B:
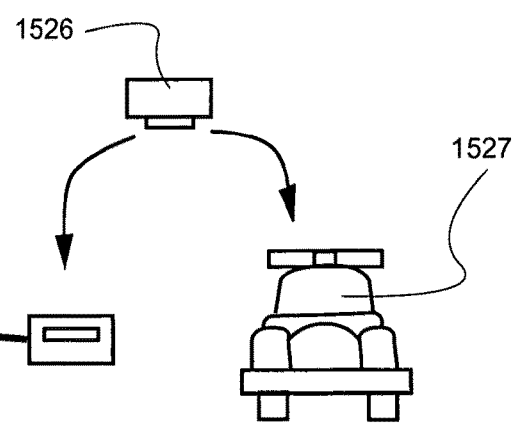
FIG. 15B illustrated an alternate setup to program a consumer programmable toy.

FIG. 15A illustrates the system for the toy to be programmed by a consumer. The computer system 1500 represented by the monitor 1502, the keyboard 1503, the pointing device 1518 and the computer unit 1501 forms a programming system. Compiler software such as a compiler of the easy programming language is provided by data stored in a memory media including but not limited to CD ROM. This compiler program is installed on the computer 1500 via the CD ROM reader 1513. Alternately the compiler software can be downloaded from a remote web site, or a remote computer 1512 through a remote link 1509 to 1511. The programmable toy is connected to the computer 1501 through a communication port such as the USB ports 1507 and 1508 as illustrated. The consumer is first required to learn the specific programming rule of the compiling software and then starts to write a program defining how the toy is to perform. Typical user program is written with a process to define how the consumer wants the toy to response when a sensor signal is received. Depends on the skill of the user, a user program can be very complicated. A flow chart can be very helpful for program flow planning. There are many different kinds of flow chart look alike compiling software available in the market. Since flow chart is a two dimensional presentation, multiple layers of interaction makes the flow chart language difficult to handle for different kinds of complex event driven programming activities. Accordingly Visual Easy Format, or other enhanced type of easy programming compiling software is preferred for consumers who have little knowledge of engineering and programming background to handle the job. Once a consumer completed composing a program, the user program is compiled and translated into codes executable by the microcontroller inside the programmable toy. The code that controls the operation of the microcontroller is then downloaded into the toy 1527 through the communication port 1508 and the communication link 1506 and 1505. Alternately the consumer may download the code via the computer 1530 into a memory cartridge 1526 as shown in FIG. 15B, and then the memory cartridge 1526 storing the executable code is connected to the toy 1527 for the execution of the microcontroller provided inside the toy 1527.

The communication link 1509 to 1511 serves as an important of this invention. First of all, a library of programming tips and supporting tools can be provided to the consumers from the remote web site. Alternately, the consumer may obtain mentoring support from a remote help desk. Remote help desk for user programming had not been successful because most programs written in assembly language and even high level languages such as C and Java are very difficult to be understood by a third party. Since easy programming language is such a user-friendly programming language, most people can understand the program flow of a program written by others easily. The remote help desk concept to support consumer programming therefore starts to make sense. In another application example, the consumer may exchange programs written by other people through the remote web site. A consumer may also modify the program according to his/her desire before it is compiled and downloaded into the toy. A toy company may also support the programmable toy product line by posting exciting or valued application programs for consumer to download into their programmable toy. For example, a toy company selling a programmable doll product line may release one version of application software periodically. Each version will give the doll a different personality. In another example, a doll named Jenny may be released in May. Jenny is an athletic young girl who is always happy. The personality of Jenny is reflected in the words and motions provided in Jenny's program. In June of the same year the new code released will define the doll to be Mary, who is timid and always very cautious. In contrast, Mary's software always come with very soft sound. Since Jenny and Mary are of completely different personality, the toy company may provide a business model that prepares different fashions and sets of accessory toy members to support the code release of each month. Some of the supporting toys can be interactive accessory toy members to provide interactive actions previous discussed. Since the memory size equipped inside the doll to store program code and compressed voice messages are always limited, another exciting feature can be provided for this business model by posting a large library of voice messages for each doll on the web site to support it's release. The consumer is then able to select the particular preferred play modes and voice messages for his/her toy. Since the programs released each month is open to the public, the consumer is able to modify the program and the personality of the toy of the month when desired. Another business model allowed by this toy invention is for the consumer to post their own program on the website for exchange with other consumers. A consumer may also submit his/her toy program design to the toy company, and help the toy company to prepare for the exciting new personality release at a later month. Of course the toy company is expected to reward a consumer when his/her program is selected.

Other than providing a different personality to a toy at each interval of time, in another business model a toy company may release successive version of a doll having the doll grows every week. It means a program that provides a more intellectual or growing personality is released every week. The periodic release of program is preferred to the method of providing of all different stages of personality programs on a CD ROM because it teaches a child to be patient, and get together with his/her toy no matter he/she likes it or not, a situation that people always face in the real world.

There is another technical problem to be addressed with the periodic release of growing doll concept. Since not all dolls are bought at the same time, therefore dolls sold at different time may ask for different stage of the releases. A solution of this problem is to assign a user ID when a user logs in the remote web site. A new user is always provided the second stage of the release. Subsequent growing stages of program releases are provided month after month, or week after week. The first stage of release is always preferred to be factory installed.

Figure 16B:
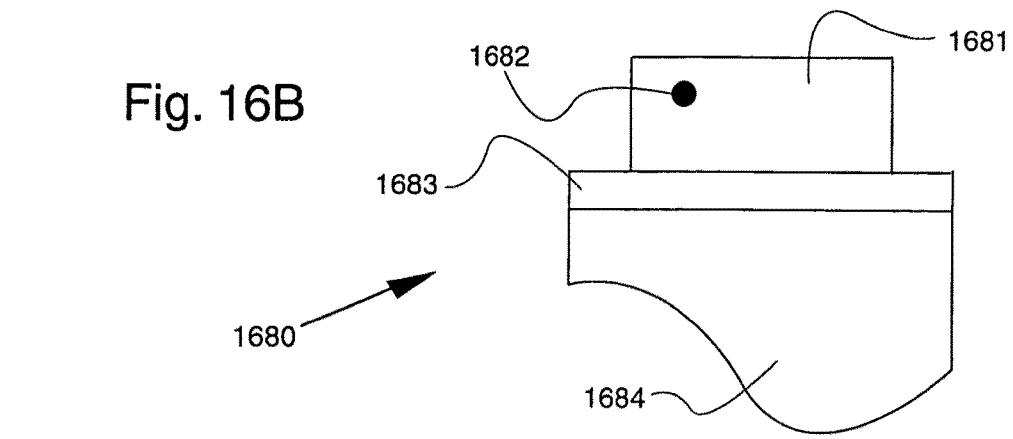
FIG. 16B illustrates a rear view of the robot of FIG. 16A.
Figure 16A:
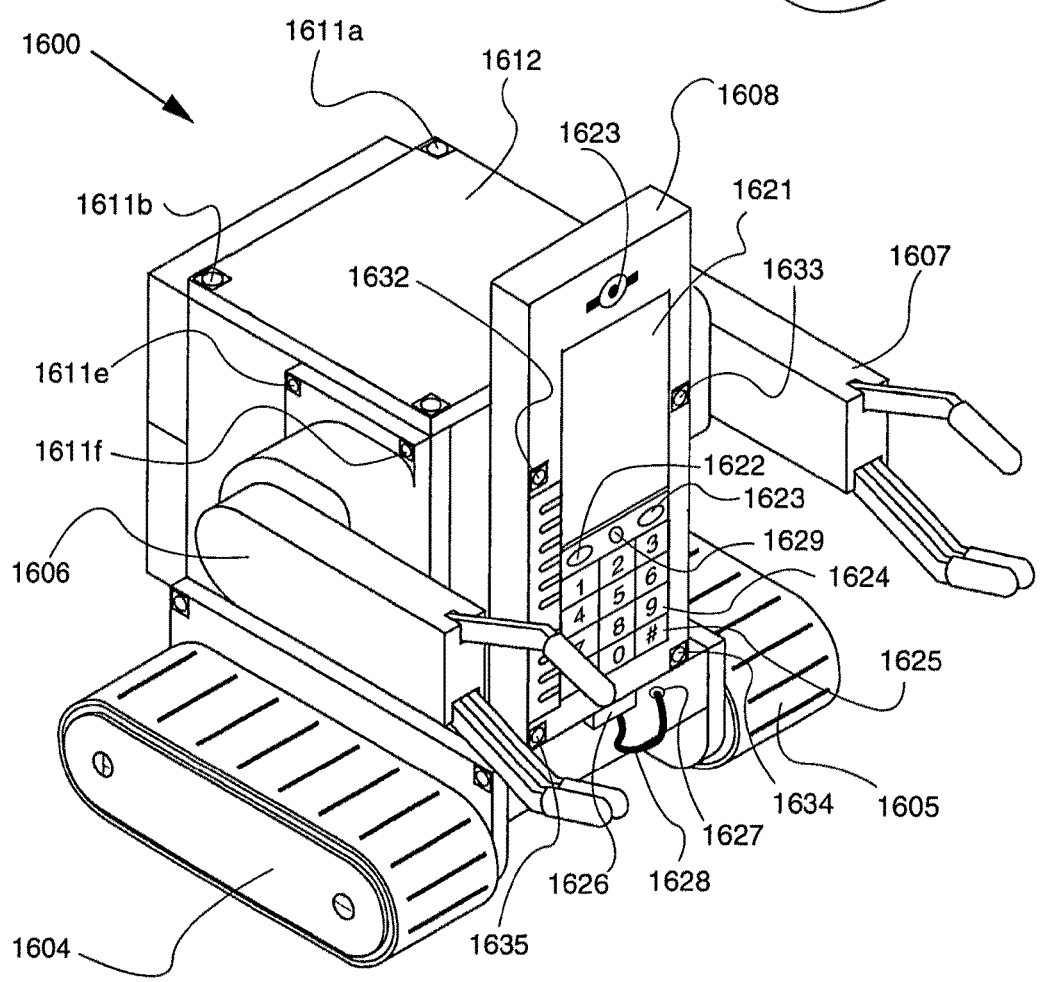
FIG. 16A demonstrated a robot built with components of the retail building kit invented, together with a smart phone/touch pad.
Figure 17:
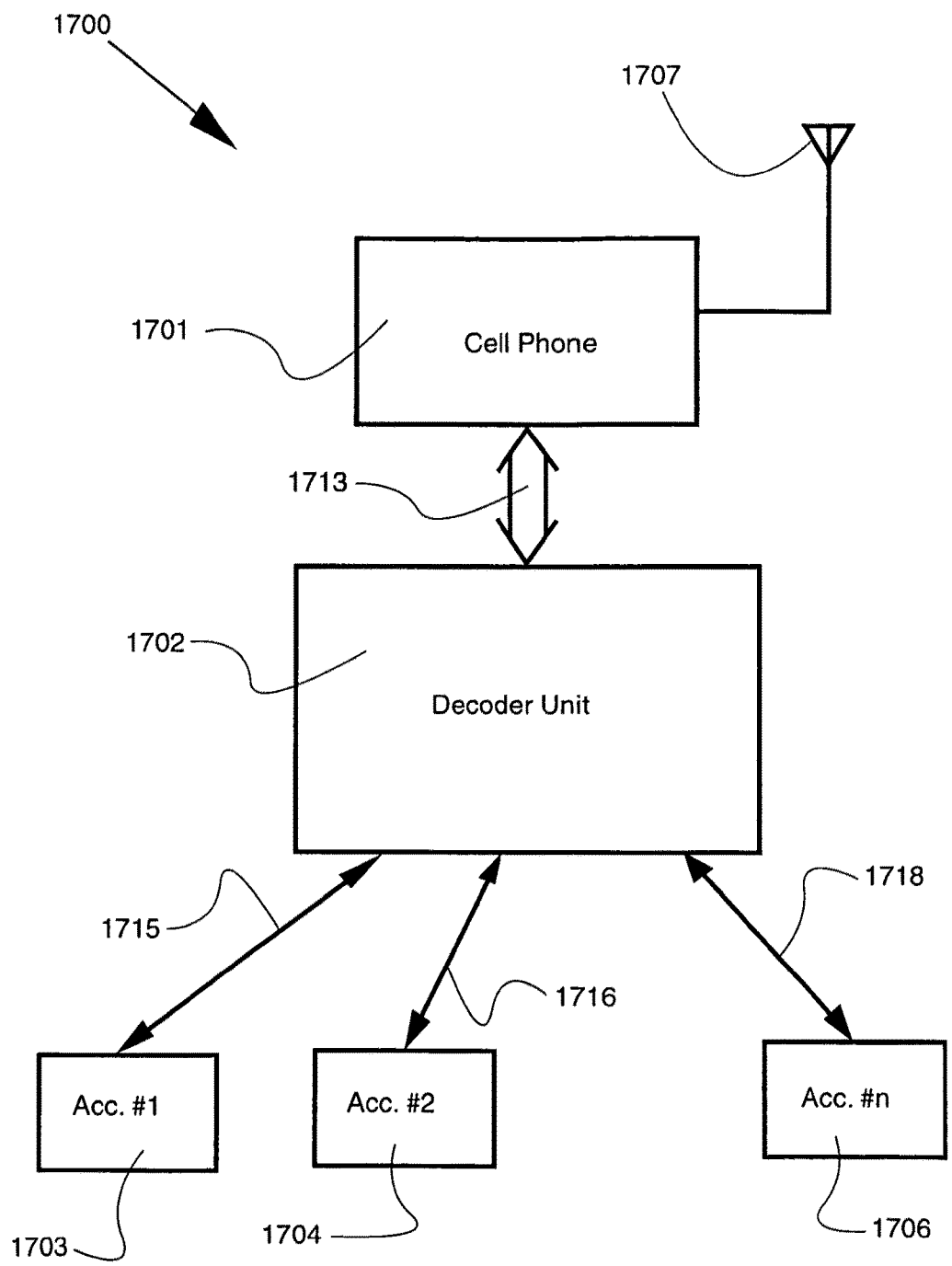
FIG. 17 illustrated a system block diagram of a consumer design system embodiment having a cell phone-touch pad.

FIG. 16A illustrated a first improvement embodiment of the consumer designed robot of FIG. 7. FIG. 17 is a block diagram to be read in conjunction with FIG. 16A,B to illustrate the structure of this improvement embodiment. A cell phone is provided as a member of the building kit. In this arrangement, the cell phone 1608, 1701 replaced the function of the controller unit 708 and the digital camera 701 of FIG. 7. The control commands provided by the cell phone processor, typically represented by a burst of serial digital signal is fed through the connector 1626 and cable 1628 to a decoder circuit 1702 located inside the compartment 1612. The decoder decodes the serial control commands into latch signals, which control the external accessory elements, such as the accessory elements 1703-1706, or the motor driving the belts 1604, 1605, and the driving motors and position sensors of the robot arms 1606 and 1607. The speaker 1623 of the cell phone replaced the sound transducer 1237 of FIG. 12, and is configured to produce audio sound or voices according to the consumer program downloaded to the cell phone. Keypads 1622-1625 replaced the input keys 1004 of the enlarged controller unit of FIG. 10. The cell phone display 1621 replaces the indicator or display 1001 of the FIG. 10 controller unit. Four mounting holes 1632-1635 are provided for the cell phone to be mounted onto the block 1612. The mounting holes, characterized the cell phone 1608 as a proprietary cell phone especially suitable to be used for the building kit disclosed herein. FIG. 16B illustrated the rear view of the robot 1600. A phone camera 1682 located around the top region 1681 of the cell phone 1608 picks up image or video signal. This camera located above the compartment 1612, 1683 replaces the camera 701 of FIG. 7. The image/video signal picked up by this camera may be displayed on the screen 1621, or transmitted to a remote cell phone/touch pad through a traditional wireless cell phone network. Alternately data representing the image or video picked up by the camera may be uploaded to a remote website for sharing with remote cameras. Battery powering the consumer designed robot is stored inside the compartment 1612.

Figure 18:
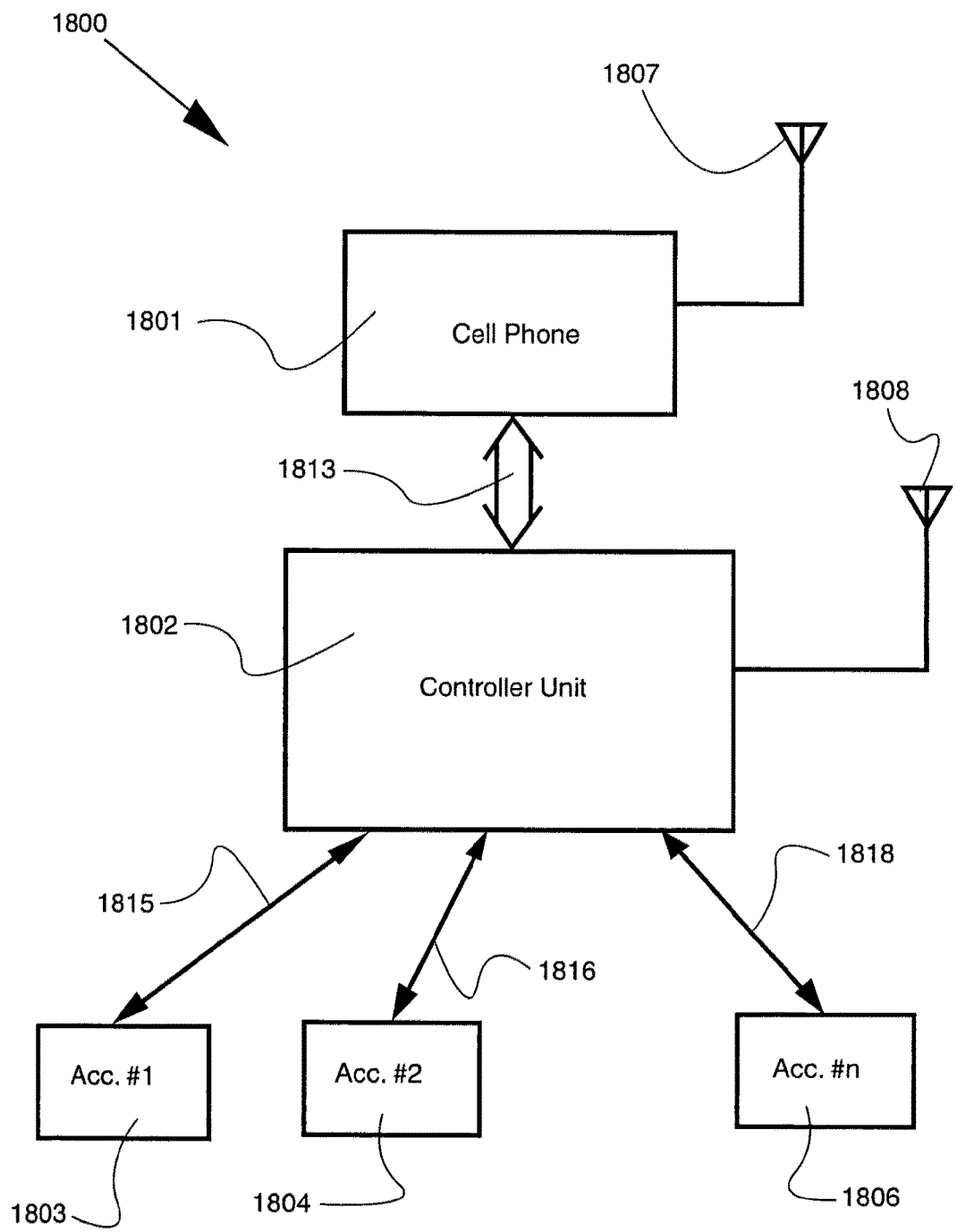
FIG. 18 illustrated a system block diagram of another consumer design system embodiment having a cell phone-touch pad.

FIG. 16A may be used to represent a second embodiment as illustrated in the block diagram of FIG. 18. In this case the controller unit 1802, 708 is relocated to inside the compartment 1612, and connected to the cell phone 1608 through the connector 1626 and the cable 1628. In this arrangement the core processor of the control unit is not replaced and the cell phone 1608 merely serves as a dialer or the communication interface 1225 of FIG. 12. The accessory elements 1703-1706 of FIGS. 17 and 1803-1806 of FIG. 18 correspond to the external accessory sensors or components of the building kit as represented in elements 1231-1239 of FIG. 12.

It should be noted that the cell phone 1608 may be replaced by a smart phone having a touch panel with few hardware keys. Alternately the cell phone 1608 may be replaced by a touch pad such as the Apple iPad or an Android compatible touch pad, to provide the same function. Apple iPod is considered as a smaller iPad equivalent. In addition to communicate through the traditional wireless cell phone network, the consumer designed system may communicate with the internet through other standard wireless communication channels, such as the wi-fi connection via a wireless routers.

Figure 19:
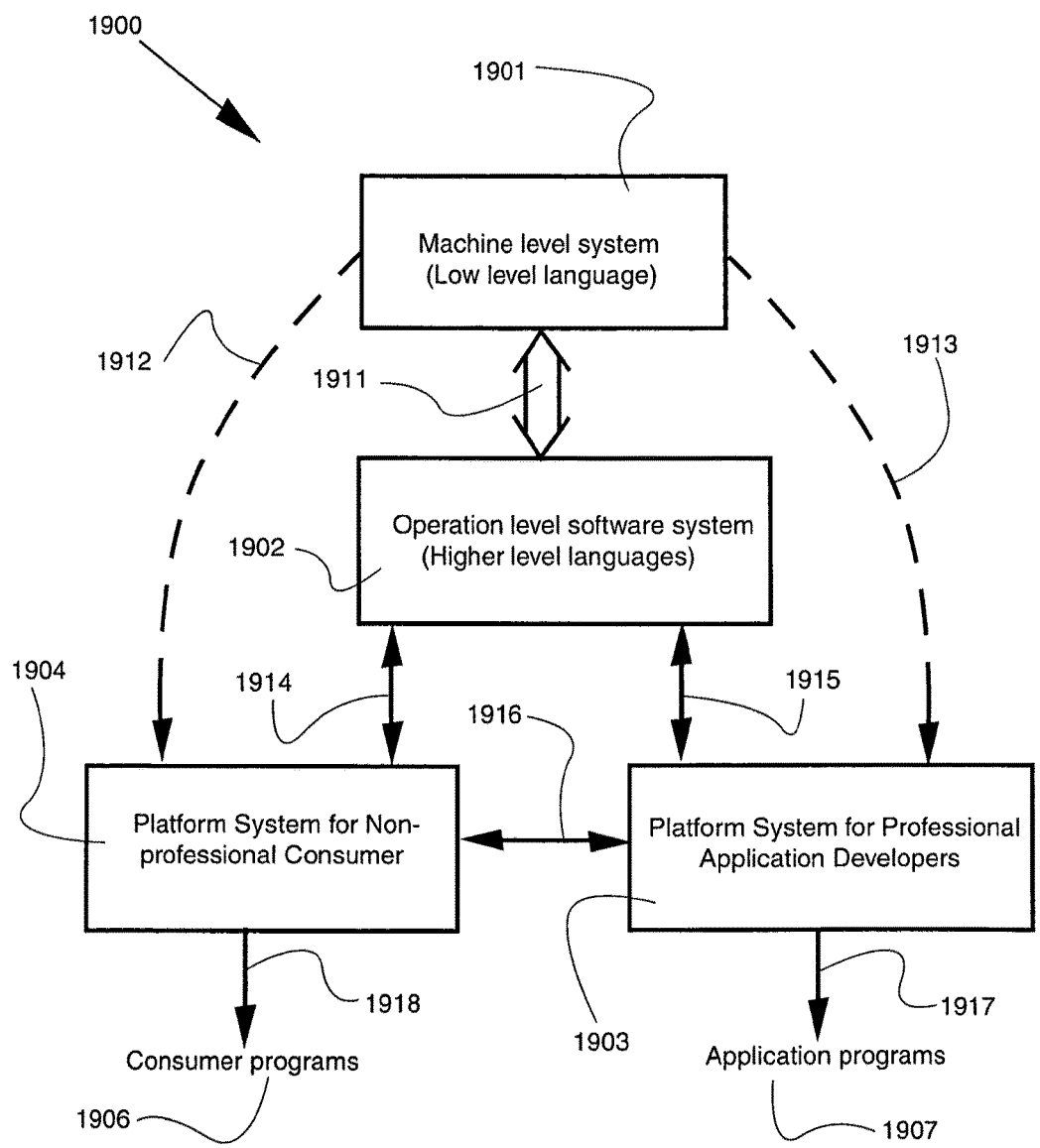
FIG. 19 illustrated a software development system embodiment of the invention.

FIG. 19 illustrated a typical software development system of the invention. The machine level software system 1901 represents the low-level language stages such as the machine code or assembly language of a smart phone/touch pad provided to support the consumer designed system. Low level languages at this level is traditionally provided by the processor IC suppliers, such as from Intel, AMD or ARM. The next level is operation level system 1902 typically represented by the Windows series provided by Microsoft, iOS provided by Apple, the Android OS provided by Google and the Linux, an open source OS. The function of this level is to provide standard interface of the computing system between variation of core processors and other functional components of the system, such as the video, audio interface, memory management, communication ports etc. The platform system for professional application developers 1903 represents the development system for a professional developer to develop application programs 1907. The first popular example of this platform is the Apple system, which comprises the iOS Simulator, Xcode tool set, Xcode IDE and Apple LLVM compiler. The second popular example is the Google Android system which includes but not limited to the Android SDK, companion Android NDK, AVD Manager, Google USB driver as well as the C, C++ programming tools suitable for working in the Android platform. The platform system for non-professional consumer 1904 is one of the core parts of the subject invention. This platform requires the discovery or invention of a consumer friendly programming language that enable non-professional consumers to easily learn and write consumer programs 1906 for the systems they designed. The reduction to practice of this platform is represented by the improved version of easy programming language, which provided new instructions specific to the nature of smart phones/touch pads. Although these new instructions derived from the research look simple (simplicity is a goal of design the easy programming language), the work required behind is heavy, including the consideration of functionality of the instruction, efficiency of programming, user friendly factors, implication to error proof development and debugging tool, and difficulties to implement into the compiler. Since instructions of easy programming language beyond the sound generating microprocessor scope is a newly invented programming language previously not available to the market, there is no experienced programmer in the art readily available to support the work of designing the new compiler and corresponding development tools. Everything had to be learned and started from sketch. FIG. 19 is a simplified system block diagram that shows many subtle relationship between each block. The relationship lines 1911-1916 represent these subtle relationships. In a first arrangement previously mentioned, the platform system for non-professional consumer is provided and maintained by an independent professional application developer, therefore the link 1916 bears the major supporting function of the block 1918. In a second preferred arrangement, the block 1918 is to be provided and maintained by Apple or Google, therefore the links 1914, 1912 bear the greatest share of the work load.

Figure 20:
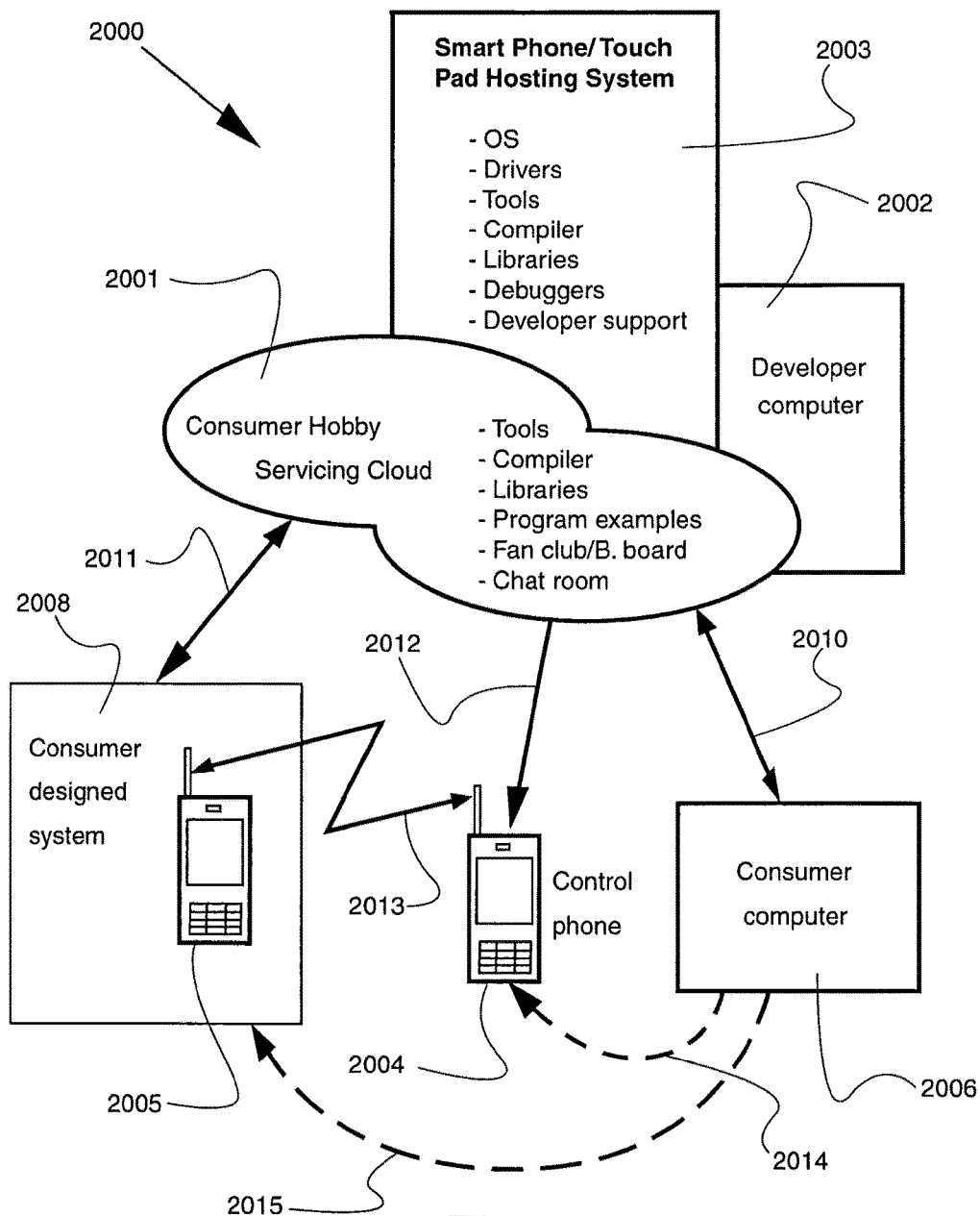
FIG. 20 illustrated a cloud computing system provided for programming a smart phone/touch pad.

FIG. 20 illustrated an embodiment about the field service system of the invention. Our goal is for an average non-professional consumer to learn the basic skill of easy programming from the cloud 2001 for about one day and then be able to try writing some easy programs. After the consumer easy program is written at the computer 2006 of the consumer, the program is uploaded to the cloud 2001. The program is analyzed by the debug tool located at the cloud 2001 for detecting obvious errors such as logical error or syntax error. If any error occurs, the debugger informs the consumer and provides friendly suggestions to resolve the error. If the consumer program seems to be proper, the compiler located at the cloud compiled the consumer easy program into codes executable by the smart phones/touch pads of the consumer. The compiler is highly preferred to be located at the cloud because it is significantly easier to maintain and upgrade the compiler, which is extremely important for a technology facing very fast changing market requirements. Besides, compiler located at the cloud makes it a lot easier for the compiler to take care of different models of smart phones/touch pads, each may come with different amount of resources, such as different amount of memory; different features, such as different LCD size and resolution, and supported with processors of different capabilities, such as different computing speed. Additional features serviced by the cloud 2001 are collections of supporting tools, libraries of template programs for different applications, beginner learning aids, chat room and bulletin board support, and fan club for consumers to exchange and discuss their programs and designs, and may be asking for advice for the problems they are facing. If the consumer platform block 1904 of FIG. 19 is provided and maintained by a professional application developer, the cloud 2001 is to be serviced and maintained by the developer computer 2002. If the consumer platform block 1904 is provided and maintained by the hosting entity such as Apple or Google, the cloud 2001 is preferred to be serviced and maintained by the hosting system 2003.

Figure 21:
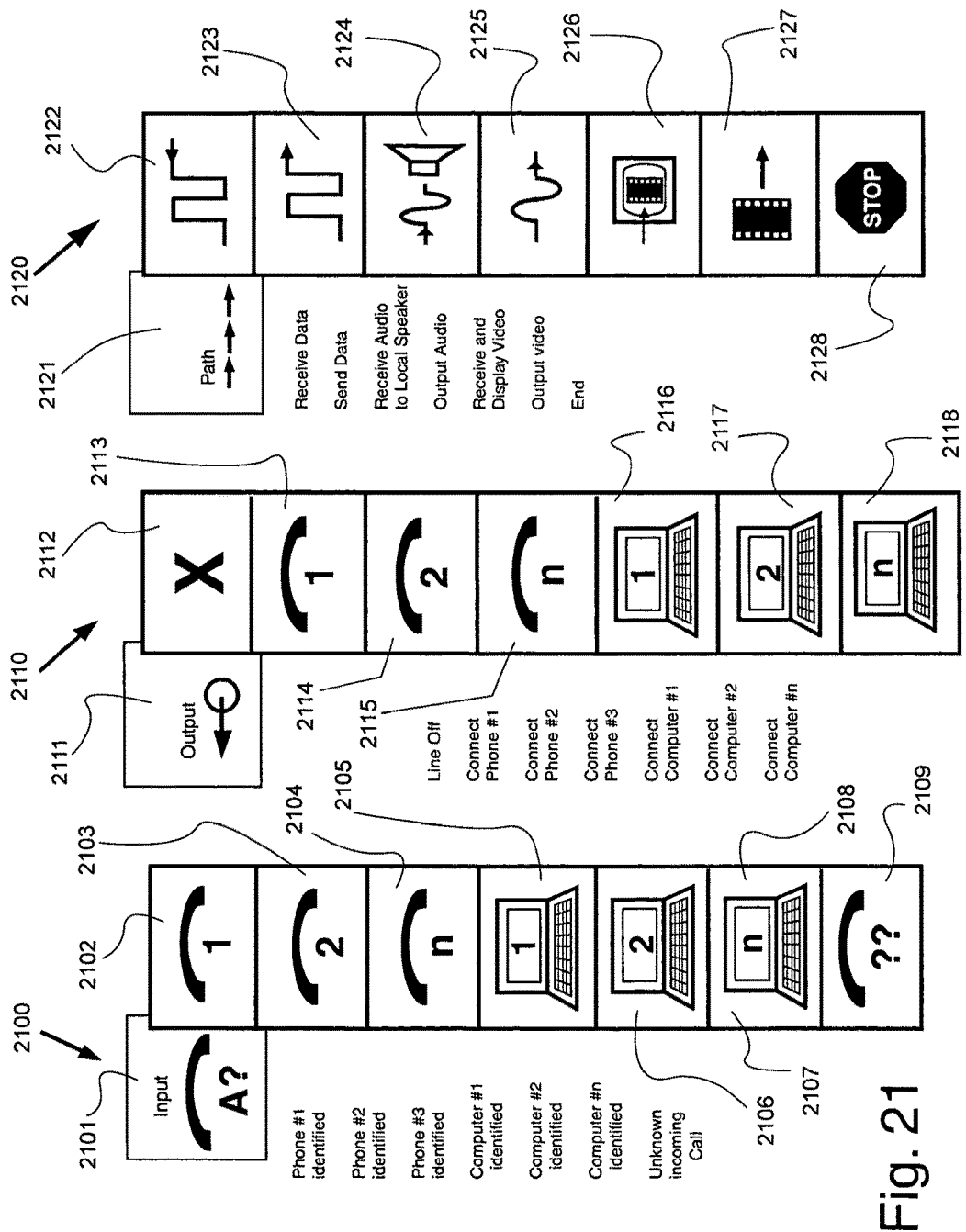
FIG. 21 illustrated the improved easy programming instructions provided for a consumer to program a smart phone/touch pad.

Special instructions illustrated in FIG. 21 provided to the enhanced easy programming software and enable a consumer to program communication connection between multiple smart phones/touch pads 2004 and 2005 of FIG. 20, though the cell phone wireless network. In an exemplary application, a consumer may program one cell phone 2004 as a remote controller to control the motion, interaction of another smart phone/touch pad 2005 assembled to form a consumer designed system positioned at a remote location, such as the robot illustrated in FIG. 16A. The remote smart phone is able to send video and audio signal to the controller phone or to be shared by computers connected to the Internet. Instruction set 2100 illustrated the input condition when a smart phone is ring. When the calling phone is identified to be phone #1, the input flag 2102 triggers a jump of a state to execute a path specific to the triggering of phone #1. Flags 2104 to 2108 represents triggering flag of other predefined phones and triggering computers. Flag 2109 indicated that the calling phone is not in the list of predefined phones or computers. In an example, a consumer may program the system to direct the phone to his personal attention or connect to voice recording function of the smart phone if the calling party cannot be identified. Instruction set 2110 illustrated the output instructions of the advanced easy programming to operate a smart phone/touch pad. Instruction 2113 indicated that the communication line is directed to call and connect phone 1. Instruction 2118 directs the system to connect to computer #n. After the connection is successfully made, a consumer may program the system to broadcast a voice recording, play a video clip and send data messages. Instruction 2112 is a line off instruction to disconnect the communication process. Instruction set 2120 are smart phone/touch pad related instruction elements provided to furnish the paths of an easy programming process, such as the program table 220 of FIG. 2. Instruction 2122 directs receiving of data. Instruction 2123 directs sending data file with the file name that follows the instruction. Instruction 2124 permits receiving audio signal from the communication line and broadcast the audio signal at the local phone speaker. Path instruction 2125 is to send stored audio message to a remote phone, or a remote computer. Path instruction 2126 directs the receiving and playing of a video file. Path instruction 2127 commands sending of a video clip. The instruction 2128 denotes the end of the path.

Figure 22:
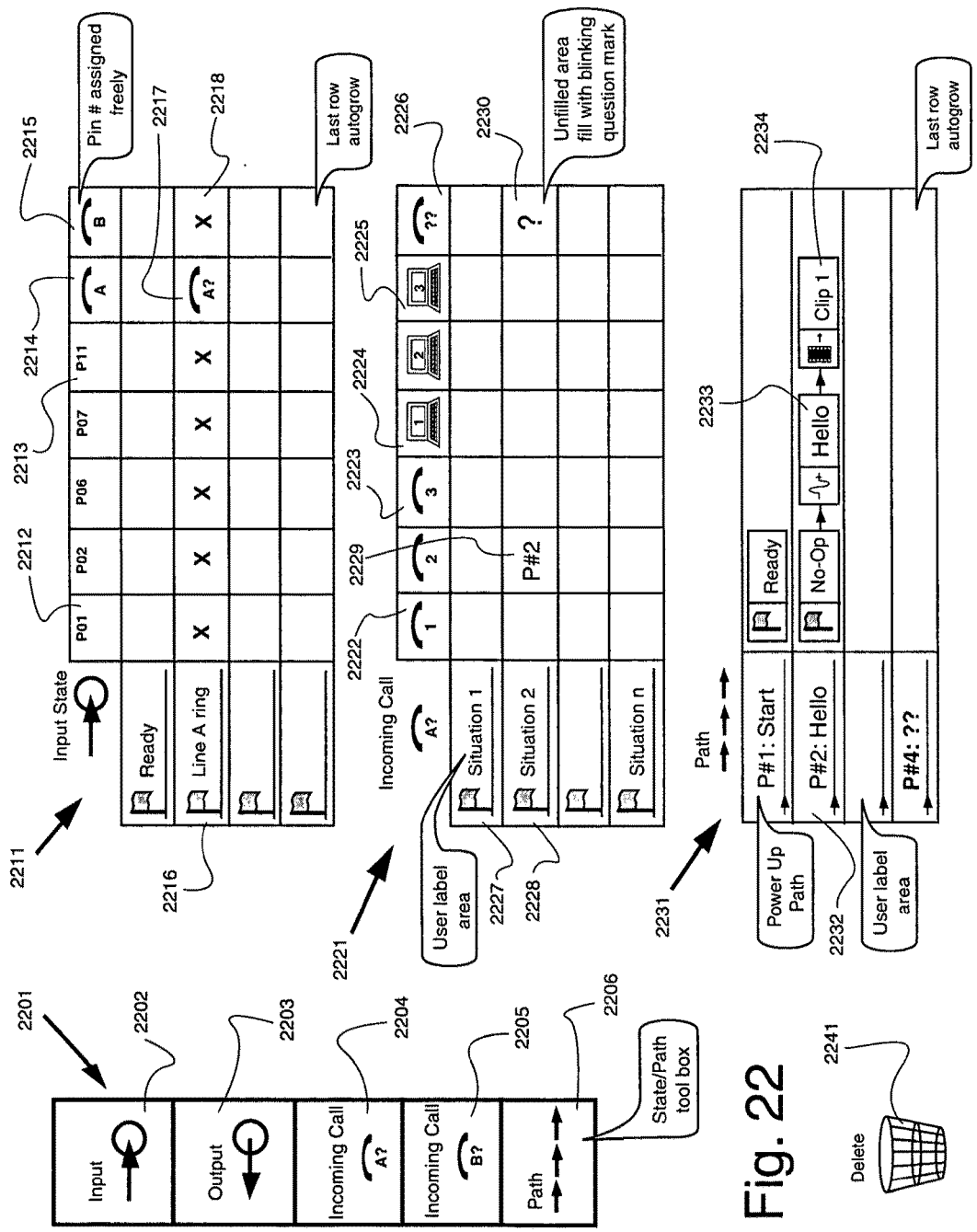
FIG. 22 illustrated an embodiment of the programming environment for a consumer to program a smart phone/touch pad.

FIG. 22 illustrates an improvement of the easy programming environment of FIG. 2 to include the smart phone/touch pad instructions for a non-professional consumer to program a smart phone/touch pad. Switches 2204 and 2205 are added for a consumer to program a two lines system, such as a smart phone of dual sim cards. The two channels is represented by channel A and channel B. Table 2211 represents an input state table of an easy program. Columns 2214 and 2215 are areas of a state table provided for determining the condition when a channel rings. In an example, if channel A flag 2217 of the state named "Line A ring" 2216 is activated, the program is directed to a table of incoming call channel A as represented by the table 2221. If state Situation 2 2227 of table 2221 is selected as the active state, and the incoming call of channel A is identified to be from phone #2, then path P#2 is activated. Flag 2218 of state 2216 indicated the channel B is blocked and no call from channel B can be received. Column 2226 indicates that some action needs to be defined if the channel A call cannot be identified. If the flag 2230 of state 2228 is not filled, a question mark will blink at the flag area 2230 to remind the consumer to complete this area of the program. Table 2231 is a path table involving operation of smart phone/touch pad. Command P#2 2229 of state 2228 directs the activation of the path 2232 named as Hello by the consumer. This path directs the smart phone/touch pad to provide a small pause, then say the message "Hello" and then send a video clip named clip 1 to the other end of channel A.

Figure 23:
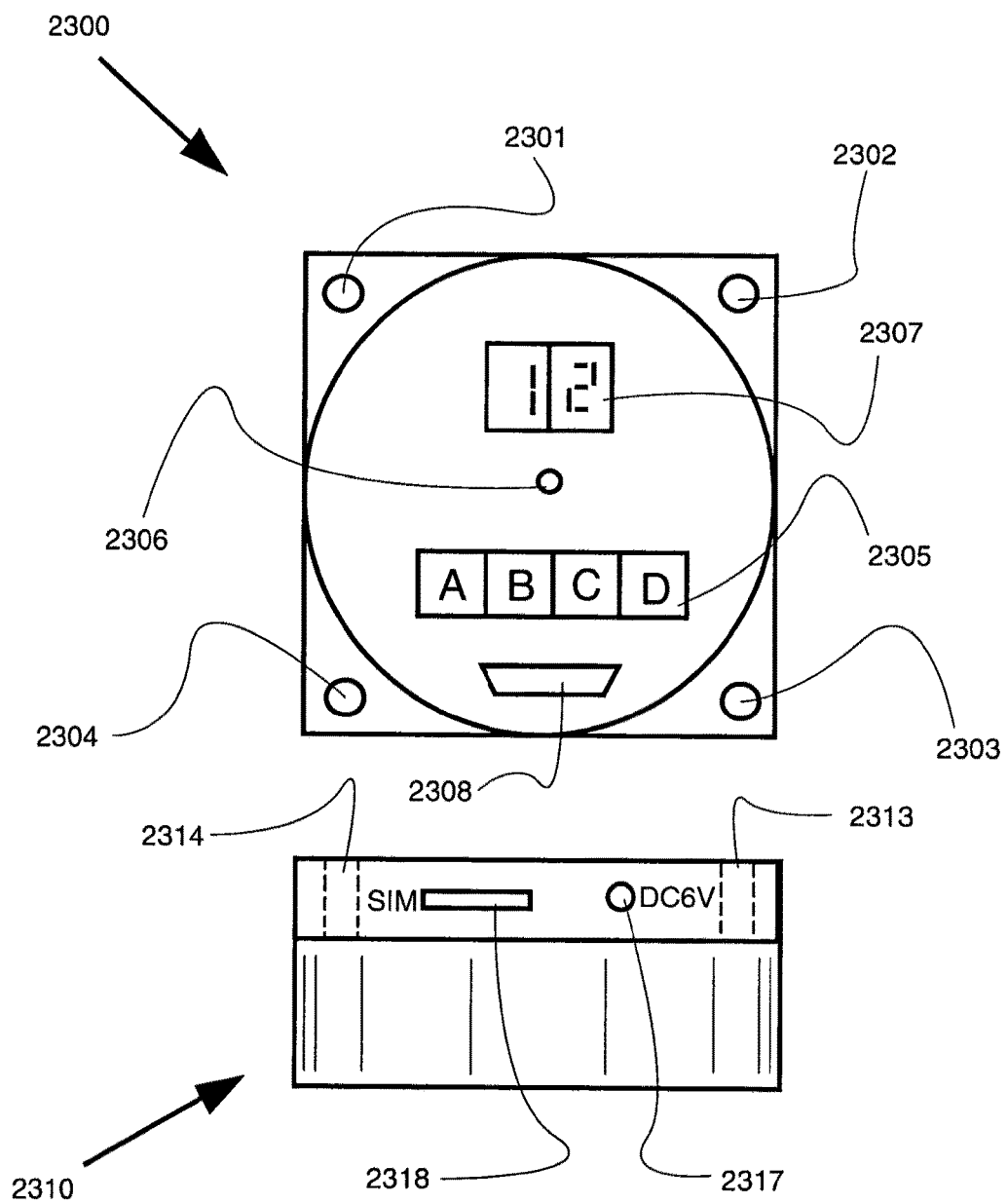
FIG. 23 illustrated an exemplary embodiment of a proprietary smart phone.

FIG. 23 illustrated the design of an unusual proprietary smart phone. The phone comprises a connector 2308 for connecting to control external elements. Four push buttons 2305 named as A to D are provided to receive external trigger selections. A pin hole CMOS camera sensor 2306 is provided to capture image or video. 2 digits, 7 segments LED 2307 is provided for indication or debugging reference. At the bottom of the proprietary smart phone is a SIM card slot 2318 and a power socket 2317 to receive 6V DC supply from a power adaptor. Four mounting holes 2301-2304 are provided for mounting the proprietary smart phone to the assembly of the consumer designed system. The purpose of the reduced functions smart phone 2300 is to reduce the cost of the smart phone, which is supplied for a consumer to design and build a surveillance system, according to the special needs of the consumer. Obviously this proprietary smart phone is not usable by traditional smart phone users, except for the retail building kit purchased by a consumer who wants to design, build and program his special featured surveillance system.

From the foregoing, it can be appreciated that the hardware and software embodiments of the smart phone/touch pad programming system have been adequately disclosed herein enabling a consumer to design and write program for a consumer designed hobby system. The preferred embodiments of the invention described herein are exemplary and numerous modifications, specification variations and circuit rearrangements can be readily envisioned to achieve an equivalent result, all of which are intended to be embraced within the scope of the appended claims.

I claim:

1. A consumer programmable smart phone/touch pad system provided for a consumer to build a consumer programmable assembly; said consumer programmable smart phone/touch pad system comprises:
    a building kit configured for a consumer to build and to program said consumer programmable assembly;
    a controller unit having a controller housing and a microprocessor; said controller unit further comprises a communication channel/link for said controller unit to interface with one or more accessory member configured to work with said controller unit,
    wherein each of said accessory member further comprises at least one of the following elements:
        (1) motion transducer;
        (2) position sensor;
        (3) analog signal provider;
        (4) digital signal provider;
        (5) light transducer;
        (6) optical sensor or camera image sensor;
        (7) sound transducer;
        (8) sound sensor;
        (9) memory;
        (10) dialing circuit;
        (11) modem circuit or wired data communication circuit; and
        (12) wi-fi or wireless data communication circuit;
    and wherein said consumer programmable smart phone/touch pad system further comprises a consumer supporting software having instructions configured for a consumer to program a smart phone/touch pad, and to program said consumer programmable assembly to work with said smart phone/touch pad.

2. The consumer programmable smart phone/touch pad system of claim 1 further comprising anyone of the following characteristics (a) to (c):
    (a) said consumer programmable system does not comprise a smart phone/touch pad, a smart phone/touch pad is to be provided by the consumer to work with the system;
    (b) said consumer programmable system comprises a smart phone/touch pad or a proprietary cell phone/touch pad;
    (c) a compiler to compile a consumer composed program into a first smart phone/touch pad code executable by a processor located in said smart phone/touch pad and a second microprocessor code executable by the microprocessor of said controller unit.

3. The consumer programmable smart phone/touch pad system of claim 1 wherein said consumer supporting software further comprises an instruction configured for said controller unit to control any of the following functions (a) to (f):
    (a) to answer or dial a smart phone or a touch pad;
    (b) to transmit or receive data through a smart phone or a touch pad;
    (c) to transmit or receive data representing audio signal through a smart phone or a touch pad;
    (d) to transmit or receive data representing visual image or video through a smart phone or a touch pad;
    (e) to interact with a developer application program;
    (f) to connect with a remote computing device through a smart phone or a touch pad.

4. The consumer programmable smart phone/touch pad system of claim 1 wherein said supporting software comprises instructions enabling a consumer to program a first smart phone/touch pad and a second smart phone/touch pad; and for said second smart phone/touch pad to control the operation or interaction of said first smart phone/touch pad with any of said accessory members, when said first smart phone/touch pad is connected with said second smart phone/touch pad through a cell phone network.

5. The consumer programmable smart phone/touch pad system of claim 1 further comprises
    a first compiler configured for compiling a consumer composed program into codes executable by said smart phone or touch pad; and
    a second compiler configured to compile said consumer composed program into codes executable by said consumer programmable assembly.

6. The consumer programmable smart phone/touch pad system of claim 1 wherein said consumer supporting software is represented by an Easy Format software, or derived from an Easy Format software, said Easy Format software is defined to comprise the following programming steps (a) to (e):
    (a) defining m inputs for a computing device to receive data, triggers or signals, wherein m is an integer equal or greater than one;
    (b) defining n outputs for said computing device to transmit data, triggers or signals, wherein n is an integer equal or greater than one;
    (c) specifying x configuration states and y events, wherein each configuration state defines the configuration of at least one input and/or one output ; wherein x and y are integers equal or greater than one;
    (d) for any configuration state of step (c) provided to configure an input, said configuration state is further structured to specify a qualifying condition, and to specify an event to be executed when the signal, trigger or data received by said input satisfied said qualifying condition;
    (e) enabling an event to switch from a current configuration state to another configuration state;
and wherein said Easy Format software further comprises at least one of the following steps or characteristics (f) to (i):

(f) a step to structure a programming specification into at least a first field and a second field, wherein said first field specifies the characteristics of one or more configuration states, and said second field specifies one or more events/sub-events;

(g) a step to organize at least a part of the data specified by said programming steps (a) to (e) into a table format;

(h) wherein said configuration states and events are not required to be listed in sequential relationship to each other;

(i) a step to label a configuration state or event for specifying a default condition of said consumer programmable system when it is powered up.

7. The consumer programmable smart phone/touch pad system of claim 6 further comprising a programming step of:

(j) providing at least one instruction for said Easy Format software to control the operation of a smart phone/touch pad.

8. A consumer programmable system having a consumer programmable assembly and a supporting software configured for supporting said consumer programmable assembly, wherein said consumer programmable system comprises a first device operated according to a smart phone/touch pad hosting system and wherein said supporting software comprises a first compiler configured for compiling a consumer composed program for working with said first device, wherein said supporting software further comprises a second compiler compatible with said first device and configured to compile said consumer composed program for working with said consumer programmable assembly;
and wherein said smart phone/touch pad hosting system is defined as a standardized or regulated system provided and maintained by a known hosting entity for servicing a hosted family of cell phone/touch pad products.

9. The consumer programmable system of claim 8 wherein said consumer programmable assembly is built by said consumer with a building kit comprising two or more accessory member separated from said first device, wherein each of said accessory members comprises at least one of the following element (1) to (12):

(1) motion transducer;
(2) position sensor;
(3) analog signal provider;
(4) digital signal provider;
(5) light transducer;
(6) optical sensor or camera image sensor;
(7) sound transducer;
(8) sound sensor;
(9) memory;
(10) dialing circuit;
(11) modem circuit or wired data communication circuit; and
(12) wi-fi or wireless data communication circuit.

10. The consumer programmable system of claim 8 further comprising one of the following characteristics (a) to (c):

(a) said first device is represented by a smart phone or touch pad, or a proprietary cell phone/touch pad;
(b) said first device is a smart phone/ touch pad provided by a consumer;
(c) wherein said first compiler and said second compiler are parts of a compiler to compile a consumer composed program into a first smart phone/touch pad code executable by a processor located in said smart phone/touch pad and a second microprocessor code executable by a microprocessor of said consumer programmable assembly.

11. The consumer programmable system of claim 10 further comprising a controller member and wherein said supporting software further comprises an instruction configured for said controller member to control anyone of the following functions (a) to (f):

(a) to answer, communicate or operate said smart phone or touch pad;
(b) to transmit or receive data through said smart phone or touch pad;
(c) to transmit or receive data representing audio signal through said smart phone or touch pad;
(d) to transmit or receive data representing visual image or video through said smart phone or touch pad;
(e) to interact with said first developer application program;
(f) to connect or communicate with a remote computing device through said smart phone or touch pad.

12. The controller programmable system of claim 8 wherein said first device is represented by a first smart phone/touch pad, and said supporting software further comprising instructions enabling said consumer to program said first smart phone/touch pad and a second smart phone/touch pad; and for said second smart phone/touch pad to control the operation of said first smart phone/touch pad through a cell phone channel/network.

13. The consumer programmable system of claim 8 wherein at least one of said first compiler or said second compiler is configured to compile a program or codes representing an Easy Format software, or derived from an Easy Format software, said Easy Format software is defined to comprise the following programming steps (a) to (e):

(a) defining m inputs for a computing device to receive data, triggers or signals, wherein m is an integer equal or greater than one;
(b) defining n outputs for said computing device to transmit data, triggers or signals, wherein n is an integer equal or greater than one;
(c) specifying x configuration states and y events, wherein each configuration state defines at least one input and/or one output; wherein x and y are integers equal or greater than one;
(d) for any configuration state of step (c) provided to configure an input, said configuration state is further structured to specify a qualifying condition and to specify an event to be executed when the signal, trigger or data received by said input satisfied said qualifying condition;
(e) enabling an event to switch from a current configuration state to another configuration state; and wherein said Easy Format software further comprises at least one of the following steps or characteristics (f) to (i):

(f) a step to structure a programming specification into at least a first field and a second field, wherein said first field specifies the characteristics of one or more configuration states, and said second field specifies one or more events/sub-events;
(g) a step to organize at least a part of the data specified by the steps of (a) to (e) into a table format;
(h) wherein said configuration states and events are not required to be listed in sequential relationship to each other;
(i) a step to label part of a configuration state or event for specifying a default condition of said consumer programmable system when it is powered up.

14. A consumer programmable system having a consumer programmable assembly and a consumer programmable supporting software configured for supporting said consumer programmable assembly; said consumer programmable assembly comprising:

a decoder unit comprising a communication channel/link for said decoder unit to interface with a first device operated according to a smart phone/touch pad hosting system; wherein said decoder unit is further configured for interfacing with one or more accessory members separated from said decoder unit and for said first device to provide controlling function to said consumer programmable system with the support of an application program, wherein an accessory member interfaced with said decoder unit comprises at least one of the following elements (1) to (12):
(1) motion transducer;
(2) position sensor;
(3) analog signal provider;
(4) digital signal provider;
(5) light transducer;
(6) optical sensor or camera image sensor;
(7) sound transducer;
(8) sound sensor;
(9) memory;
(10) dialing circuit;
(11) modem circuit or wired data communication circuit; and
(12) wi-fi or wireless data communication circuit wherein said consumer programmable supporting software comprises multiple consumer programmable instructions compatible with said smart phone/touch pad hosting system; said consumer programmable instructions are also configured for said decoder unit to work with said first device; and wherein said smart phone/touch pad hosting system is defined as a standardized or regulated system provided and maintained by a known hosting entity for servicing a hosted family of cell phone/touch pad products.

15. The consumer programmable system of claim 14 further comprising anyone of the following characteristics (a) to (c):
(a) said first device is represented by a smart phone or touch pad, or a proprietary cell phone/touch pad;
(b) said first device is a smart phone/touch pad provided by a consumer;
(c) a compiler to compile a consumer composed program into a first smart phone/touch pad code executable by a processor located in said smart phone/touch pad, and a second microprocessor code executable by a microprocessor located inside said consumer programmer assembly.

16. The consumer programmable system of claim 15 wherein said consumer programmable supporting software further comprises an instruction configured for said consumer programmable system to control any of the following functions (a) to (f):
(a) to answer, communicate or operate said smart phone/touch pad;
(b) to transmit or receive data through said smart phone/touch pad;
(c) to transmit or receive data representing audio signal through said smart phone/touch pad;
(d) to transmit or receive data representing visual image or video through said smart phone/touch pad;
(e) to interact with a developer application program;
(f) to connect or communicate with a remote computing device through said smart phone/touch pad.

17. The consumer programmable system of claim 14 wherein said consumer programmable supporting software comprises:
a first compiler configured for a developer to compile a first developer application program for working with a first smart phone or touch pad;
a second compiler configured to compile a second consumer application program for said consumer programmable assembly.

18. The consumer programmable system of claim 14 wherein said supporting software is configured to process a program or codes representing an Easy Format software, or derived from an Easy Format software, said Easy Format software is defined to comprise the following programming steps (a) to (e):
(a) defining m inputs for a computing device to receive data, triggers or signals, wherein m is an integer equal or greater than one;
(b) defining n outputs for said computing device to transmit data, triggers or signals, wherein n is an integer equal or greater than one;
(c) specify x configuration states and y events, wherein each configuration state defines at least one input and/or one output; wherein x and y are integers equal or greater than one;
(d) for any configuration state of step (c) provided to configure an input, said configuration state is further structured to specify a qualifying condition and to specify an event to be executed when the signal, trigger or data received by said input satisfied said qualifying condition;
(e) enable an event to switch from a current configuration state to another configuration state; and wherein said Easy Format software further comprises at least one of the following steps or characteristics (f) to (i):
(f) a step to structure a programming specification into at least a first field and a second field, wherein said first field specifies the characteristics of one or more configuration states, and said second field specifies one or more events/sub-events;
(g) a step to organize at least a part of the data specified by the steps of (a) to (e) into a table format;
(h) wherein said configuration states and events are not required to be listed in sequential relationship to each other;
(i) a step to label part of a configuration state or event for specifying a default condition of said consumer programmable system when it is powered up.

19. The consumer programmable system of claim 18 wherein said Easy Format software further comprising an instruction to operate said first device.

20. The consumer programmable system of claim 14 wherein said supporting software comprises instructions enabling said consumer to program a first smart phone/touch pad and a second smart phone/touch pad; and for said second smart phone/touch pad to control the operation of said first phone/touch pad linked with any of said elements, when said first phone/touch pad is connected with said second phone/touch pad through a cell phone network.

* * * * *